(12) United States Patent  (10) Patent No.: US 8,314,688 B2
Pahlavan et al.  (45) Date of Patent: Nov. 20, 2012

(54) METHOD AND APPARATUS FOR LOW POWER MODULATION AND MASSIVE MEDIUM ACCESS CONTROL

(75) Inventors: Kourosh Pahlavan, Palo Alto, CA (US); Farokh Hassanzadeh Eskafi, Brooklyn, NY (US)

(73) Assignee: TagArray, Inc., Palo Alto, CA (US)

( * ) Notice: Subject to any disclaimer, the term of this patent is extended or adjusted under 35 U.S.C. 154(b) by 84 days.

(21) Appl. No.: 11/843,543

(22) Filed: Aug. 22, 2007

(65) Prior Publication Data

US 2009/0051496 A1    Feb. 26, 2009

(51) Int. Cl.
G05B 11/01 (2006.01)
G08C 19/12 (2006.01)
H04J 11/00 (2006.01)
H04W 4/00 (2009.01)
H04L 27/06 (2006.01)

(52) U.S. Cl. .............. 340/12.51; 340/13.26; 370/208; 370/329; 375/341

(58) Field of Classification Search .............. 370/213; 375/353
See application file for complete search history.

(56) References Cited

U.S. PATENT DOCUMENTS

| | | | |
|---|---|---|---|
| 5,124,699 A | 6/1992 | Tervoert et al. | |
| 5,266,925 A | 11/1993 | Vercellotti et al. | |
| 5,365,551 A | 11/1994 | Snodgrass et al. | |
| 5,390,360 A | 2/1995 | Scop et al. | |
| 5,410,315 A | 4/1995 | Huber | |
| 5,489,908 A | 2/1996 | Orthmann et al. | |
| 5,528,625 A | 6/1996 | Ayanoglu et al. | |
| 6,002,344 A | 12/1999 | Bandy et al. | |
| 6,286,762 B1 | 9/2001 | Reynolds et al. | |
| 6,895,034 B2* | 5/2005 | Nunally et al. | 375/130 |
| 6,973,064 B2* | 12/2005 | Terry et al. | 370/335 |
| 7,082,153 B2* | 7/2006 | Balachandran et al. | 375/138 |
| 7,180,421 B2 | 2/2007 | Pahlaven et al. | |
| 7,212,125 B2 | 5/2007 | Shanks et | |
| 2005/0058184 A1* | 3/2005 | Paul et al. | 375/148 |
| 2005/0232135 A1* | 10/2005 | Mukai et al. | 370/208 |
| 2006/0144943 A1* | 7/2006 | Kim | 235/451 |
| 2008/0012688 A1* | 1/2008 | Ha et al. | 340/10.1 |
| 2009/0067552 A1* | 3/2009 | Miscopein et al. | 375/341 |

OTHER PUBLICATIONS

Andrew S. Tanenbaum, "Computer Networks", pp. 162-163, 4th Ed., 2003.*
N. Abramson, The Aloha System—Another Alternative for Computer Communications, Proceedings of Fall Joint Computer Conference, AFIPS Conference, 1970 http://www.isoc.org/internet/history/brief.shtml.
EPC-Global, UHF specification for 2nd Generation RFID system, http://www.epcglobalinc.org/standards_technology/EPCglobalClass-1Generation-2UHFRFIDProtocolV109.pdf 2005.

(Continued)

*Primary Examiner* — Brandon Renner
(74) *Attorney, Agent, or Firm* — Haynes and Boone, LLP

(57) ABSTRACT

An ultra low power, low complexity, low collision, deterministic modulation method that also works as a massive medium access mechanism for communication systems is based on positioning data in a communication resource space, such as time and frequency, such that the position of a symbol in that space determines its value and its access to the medium. The number base of the symbol is determined by the size of the subset of the resource space it is positioning itself in and, thereby, a few sparsely located symbols can convey a large value, while the remainder of the space can be simultaneously and massively used by other sparsely resource using members of the network.

9 Claims, 18 Drawing Sheets

OTHER PUBLICATIONS

Part 15.4: Wireless Medium Access Control (MAC) and Physical Layer (PHY) Specifications for Low-Rate Wireless Personal Area Networks (LR-WPANs)Ching Law, Kayi Lee, and Kai-Yeung Siu, "Efficient Memoryless Protocol for Tag Identification", MIT-AUTOID-TR-003.

Ruben Merz, Jorg Widmer, Jean-Yves Le Boudec, and Bozidar Radunovic, "A Joint PHY/MAC Architecture for Low-Radiated Power TH-UWB Wireless Ad-Hoc Networks", School of Computer and Communication Sciences, EPFL, 2004 http://infoscience.epfl.ch/getfile.py?docid=5370&name=MerzWLBR05&format=pdf&version=1.

Jean-Yves Le Boudec, Ruben Merz, Bozidar Radunovic, Joerg Widmer, "A MAC protocol for UWB Very Low Power Mobile Ad-hoc Networks based on Dynamic Channel Coding with Interference Mitigation", EPFL Technical Report ID: IC/2004/02, 2004 http://infoscience.epfl.ch/getfile.py?docid=4230&name=IC_TECH_REPORT_200402&format=pdf&version=1.

* cited by examiner

METHOD AND APPARATUS FOR LOW POWER MODULATION AND MASSIVE MEDIUM ACCESS CONTROL

BACKGROUND OF THE INVENTION

1. Technical Field

The invention relates to medium access control (MAC) layer design and data modulation in a communication system. The invention also relates to any scenario where resources that can be represented numerically are shared and an allocation scheme is subsequently required. The medium access control (MAC) layer is responsible for managing channel access for communicating parties.

2. Description of the Prior Art

There are three general approaches to providing access to multiple users of a communication system:

1. Divide the channel by time, frequency, code, or a combination and allocate the channel slices to the communicating parties either statically or dynamically. Examples of this application include Code Division Multiple Access (CDMA) and Time Division Multiple Access (TDMA) algorithms.
2. Let the users compete (listen) for the channel, transmit when the channel is quiet, look for acknowledgements from receiver to determine whether the data has been transmitted without error, and retransmit when a collision occurs. Carrier Sense Multiple Access with collision avoidance (CSMA-CA), which is the basis of Ethernet communications, is an example of this approach.
3. A combination of approaches 1, and 2, above. Slotted Aloha is an example of this approach.

Abramson (N. Abramson, The Aloha System—Another Alternative for Computer Communications, Proceedings of Fall Joint Computer Conference, AFIPS Conference, 1970 http://www.isoc.org/internet/history/brief.shtml) invented Aloha and its more efficient variation, Slotted Aloha. In Slotted Aloha, the transmitters reserve a slot in the reservation time and then transmit in the reserved slot. When there is more than one transmitter, contentions in the reservation time happen. The contention is resolved by having the transmitter first listening to the channel and, if channel is not available, then waiting a random time before requesting for a reserved slot.

When it comes to low-power efficient interrogation with low complexity, Radio Frequency Identification (RFID) technology is a natural application and a direct beneficiary. The first two generations of RFID, i.e. Gen-0 and Gen-1, use the third approach outlined above by applying binary tree search algorithms to identify all tags in the vicinity of an interrogator. The following steps are used by the algorithm:

1. An interrogator broadcasts a wake-up message.
2. All tags wake up and energize themselves.
3. The interrogator starts an inventory round.
4. All tags respond; if only one tag responds, there is no collision; otherwise, there are collisions.
5. The interrogator detects the collisions and starts a binary search algorithm to isolate all tags.

The binary search algorithm is as follows:

1. The interrogator asks all tags whose least significant bit (LSB) is a binary "0" to transmit; if no or one tag responds, then the interrogator moves to the other branch by asking all tags whose LSB is a "1" to transmit.
2. If a collision occurs, the interrogator branches and asks all tags whose LSB is "00" to transmit.

In this manner the algorithm reaches all leaves and can isolate and read all tags.

As is apparent, this algorithm is very inefficient when there are many tags. A variation of this algorithm tries to do a more efficient search. Still, this approach cannot exhibit high performance when employed in massive interrogation with a physical layer based on narrowband backscattering. It requires at least two downlink messages per tag, which renders it inefficient.

The following work has proposed variations to the above algorithms:

In Tervoert et al. (U.S. Pat. No. 5,124,699 Jun. 23, 1992 Tervoert et al.) the tags are in contention for the channel and, based on the frequency of the interrogation field (transmitted signal from interrogator), the tags either transmits or temporarily deactivates itself for a period of time.

In Vercelloti et al. (U.S. Pat. No. 5,266,925 Nov. 30, 1993 Vercellotti et al.) the contention is broken by an address that is sent by interrogator. Those tags that have an address greater the transmitted address respond. If there is more than one response, then the interrogator transmits an address that is greater than previous one. This process continues until only one tag responds.

In Scop et al. (U.S. Pat. No. 5,390,360 Feb. 14, 1995 Scop et al.) the transmitters all wait for different random delay and, at the end of the delay, they check to make sure that the channel is silent before transmitting their information. This is a variation of CSMA-CA.

In Huber (U.S. Pat. No. 5,410,315 Apr. 25, 1995 Huber) the transmitters are selected based on their group associations. The interrogator chooses a group. All transmitters that belong to that group transmit their information. If there is more than one member to the group, the interrogator chooses a subgroup of the group. This process continues until only one transmitter responds.

In Snodgrass et al. (U.S. Pat. No. 5,365,551 Nov. 15, 1994 Snodgrass et al.) each transmitter chooses a random number from a known range and transmits it to the interrogator. The interrogator then uses that number to link to each transmitter. If there is more than one transmitter, the interrogator has to request a subset of the transmitters to transmit their random number to avoid a collision.

In Orthmann et al. (U.S. Pat. No. 5,489,908 Feb. 6, 1996 Orthmann et al.) Each transmitter is assigned a unique identification code. The interrogation unit dynamically constructs and modifies a bit string used to solicit responses from selected transmitters until each transmitter is identified. The bit string is transmitted to the transmitters, which compare it with the least significant bits of their respective identification codes. A mismatch between the identification code and the bit string results in suppressing the response from the transmitter.

In Shanks et al. (U.S. Pat. No. 7,212,125 May 1, 2007 Shanks et al.) they propose a binary traversal communications protocol. In this protocol, the interrogator uses a binary search algorithm, very similar to Orthmann et al. (infra) to isolate and provide a free channel to a transmitter.

In Reynolds et al. (U.S. Pat. No. 6,286,762 Sep. 11, 2001 Reynolds et al.) the search for potential transmitters is started from a list of possible transmitters that the interrogator holds. The interrogator then performs either an inclusive or exclusive search to ascertain the presence of the transmitters that are on the list, and the possible presence of other transmitters which are not on the list.

In Bandy et al. (U.S. Pat. No. 6,002,344 Dec. 14, 1999 Bandy et al.) A tag interrogator transmits a wake-up signal followed by at least one clock signal. Each tag increments a first tag count in response to the clock signal, and transmits the Tag ID assigned to the tag when the first tag count corresponds to the Tag ID assigned to the tag. The tag interrogator records the transmitted Tag IDs. When more than one tag transmits simultaneously, the tag stores the Tag ID to resolve contention when the first read cycle is complete. In the second read cycle, the tag interrogator transmits the contended Tag ID followed by at least one clock signal. Each tag that contended for the transmitted Tag ID increments a second tag count in response to the clock signals, and transmits the manufacturer number assigned to the tag when the second tag count corresponds to the manufacturer number assigned to the tag. The tag interrogator records the transmitted Tag IDs, completing the inventory of the tags.

RFID Gen-2 MAC layer is a variation on Time Division Multiple Access, which uses a counter instead of a clock. Each tag choose a counter number randomly, from 0 to $2^n-1$ where n is an integer from 1 to 15 and is broadcast by the interrogator. The tag counter is incremented upon reception of a special increment command from the interrogator. In case of a collision, the increment command causes the tag that has just transmitted to choose another random number.

The steps are as follows:
1. The interrogator broadcasts a wake-up message.
2. All tags wake up and energize themselves.
3. The interrogator starts an inventory round.
4. All tags respond; if only one tag responds, there is no collision; otherwise, there are collisions.
5. In case of collision, this interrogator transmits a number n.
6. All tags compute a random number between 0 and $2^n-1$ for their slot number.
7. Tags that have the $0^{th}$ slot number transmit their IDs.
8. If no collision, the interrogator sends an ACK and an increment command:
9. All tags that have not transmitted yet, increment their counter number and, if it is equal to their slot number, they transmit their ID;
10. All tags that have transmitted in this inventory round go to sleep for the next round.

If collisions occur, the interrogator detects the collision and sends an increment without an ACK:
 a. All tags that have not transmitted yet increment their counter number and, if it is equal to their slot number, they transmit their IDs;
 b. All tags that have transmitted but not received an ACK prior to increment, compute another random slot number.

This MAC layer algorithm is also inefficient, because it requires at least two messages for every Tag i.e. maximum efficiency is around 50%. Another important source of inefficiency that is often not reflected in the logical operation of the MACs based on full-duplex communication is the Tx-Rx switching overhead.

IEEE 802.15.4 is the standard for low data rate Personal Area Network (PAN) communication systems, while IEEE 802.15.4a specifies the physical and MAC layers for an ultra-wide band (UWB) PAN communication system. At the physical layer, the latter specifies an ultrawide band impulse radio (UWB-IR) with direct sequence spreading with differential BPSK modulation of chips. At the MAC layer, it recommends using either slotted or unspotted algorithms.

For both systems, Carrier Sense Multiple Access with Collision Avoidance (CSMA-CA) is used. Each transmitter, when it has data to transmit, scans the channel: If the channel is quiet, the transmitter transmits its data. If the channel is busy, the transmitter backs-off, based on some predetermined algorithm, e.g. negative exponential, starts a timer and, when the timer expires, again scans the channel for activities. In the slotted version, all participants are synchronized to an external beacon. In the unslotted version, the devices are not synchronized and the starts of the back-off periods are not aligned.

Mertz and Boudec (Ruben Merz, Jorg Widmer, Jean-Yves Le Boudec, and Bozidar Radunovic, "A Joint PHY/MAC Architecture for Low-Radiated Power TH-UWB Wireless Ad-Hoc Networks", School of Computer and Communication Sciences, EPFL, 2004 http://infoscience.epfl.ch/getfile.py?docid=5370&name=MerzWLBR05&format=pdf& version=1) propose a rate-controlled, time-hopping ultrawide band (TH-UWB) transmitter. Their proposal requires both the transmitter and the receiver to time-hop at the same rate and both to be able to listen to the channel to make sure that it is not occupied by other transmitters.

In communications, modulating is the process of embedding information into a medium that can be transmitted and received. Normally a carrier is used as the medium channel selector and it is then modulated with the data through manipulation of the medium resources. The manipulated carrier is transmitted and the receiver at the other end demodulates the data and recovers the information by observing the changes in the manipulated resource.

For example, the frequency of a carrier can be varied as a function of the bits of information to be transmitted. Subsequently, the data is modulated on the carrier as variations of its frequency. Time is an omnipresent resource. Others are, but not limited to, frequency and its parameters, i.e. phase and amplitude, medium characteristics such as viscosity, density, transparency, etc. Even codes and symbol constellations can be used as medium resources. In principle, any parameters that can be changed in the medium to deliver information can be considered as a medium resource and may be altered to convey information. Time-domain radio communication, e.g. UWB Impulse Radio, uses impulses without a continuous carrier although the impulse itself may oscillate in its duration. However, most continuous wave modulations apply to UWB-IR technology as well.

The most common methods of modulation are frequency, phase, and amplitude modulation, and hybrids such as Quadrature Amplitude Modulation (QAM). A particularly easy modulation technique that lends itself well to UWB systems and fiber medium is Pulse Position Modulation (PPM) which states the binary state of an impulse based on its position inside its timeslot. In a PPM approach, the position of the pulse inside a slot determines its binary value. In 13.56 MHz frequency vicinity cards (ISO 15693 standard), the number of these positions can be 1 out of 4 or 1 out of 256. It is noteworthy that this approach is a pure modulation technique and does not address the multi-access problem.

An important characteristic of all of these technologies is that the process of modulation is distinctively separate from the process of Multi-Access. Multi-access techniques are used for finding room in the medium and modulation is used to convey data by manipulating medium resources.

The data transmission rate of a link can be increased by compression prior to transmission and decompression upon reception of the data. This compression mechanism is not an integral part of a MAC layer and is performed in a separate stage.

Higher data rates often mean a higher system performance, but also impact power dissipation, signal integrity, range, and device complexity.

It is desirable to have a MAC solution that performs optimally for any given application, especially when the system is under severe constraints in terms of power, cost, performance, and complexity. An example of such a constrained communication system is the Radio Frequency Identification (RFID). A basic RFID system is normally composed of a number of tags responding to an interrogating reader. Passive RFID tags are energized by the incident electromagnetic signals propagated by the reader, while active and semi-active tags, respectively, rely on integral power sources or a combination of the acquired and integral energy. A passive responder is consequently under extreme power constraints. It must receive enough RF energy from a distance useful to the application to power up its circuitry, normally composed of computational, memory and transmitter units. Furthermore, RFID tags are typically involved in inventory rounds in which many tags are simultaneously interrogated by a reader in a short snap. In a dynamic case, e.g. when the tags and the interrogator (the reader) are moving relative to one other, depending on the speed of the movement and the number of tags, the duration of an inventory round is increasingly important. That is, much time cannot be devoted to resolving the many collisions in the process of interrogating the tags. A typical example of this case is at point of sales (PoS). The typical scenario for PoS is that the entire content of a customer cart needs to be scanned quickly and robustly. Once the cart is driven outside the range of the reader, the window of opportunity to scan the cart is closed, which makes a quick and massive inventory scan crucial.

Even in the case of more relaxed constraints, as in conventional RF data communication and active RFID applications, low power dissipation and high data rate in a massively populated network is desirable.

SUMMARY OF THE INVENTION

The invention offers a solution to all the above mentioned issues. A distinct property of this invention is that it performs both modulation and multi-access. That is, the application of this invention alone solves both problems, although it allows for additional modulation based on traditional schemes as well.

The MAC function of this invention is based on two premises, under which it exhibits high performance and efficiency:

1. There are many simultaneously communicating parties in the network. This is, for example, the case in a RFID scenario where a number of different tags in the range of operation respond to the inquiries by a reader. A sensor network, a computer device with many of its components communicating simultaneously over a link, and a computer network are other examples.

2. Each party communicates a unique number as at least a portion of its data. This unique number can be the data itself, the transponder's MAC address, a data location address in the memory, etc.

Ultrawide band radio (UWB) has been successfully applied to large networks of low power transponders. To date, all these transponders have been active because:

1. An important feature of UWB is its ability to offer high data rate at low average power. A full-fledged UWB receiver, in particular, deploys a front-end and detection circuitry that, despite relative efficiency compared to many conventional radios, is still too power dissipating to apply to an ultra low power application, such as a passive radio.

2. As opposed to continuous wave (CW) radio designs that can put out a considerable amount of power in a well-regulated relatively narrow band, a UWB radio has to spread its power over an extremely wide frequency band. Collecting reasonable amounts of intentionally emitted energy over such a huge band at a reasonable distance and high efficiency is currently impractical. In addition, UWB radio competes with conventional CW radio by the virtue of decreased power per transmitted bit. Increasing the power output of a UWB transmitter does not result in a better power economy compared to CW radios and is a contradiction in premises.

3. High data rate UWB radio also requires a high number of impulse bursts generated by the transponder. Although a UWB transmitter allows for a low average power per bit, each impulse burst requires a considerable amount of energy for the short instance of time when the impulse is fired. A burst of impulses puts serious constraints on power accumulation abilities of the circuitry to deliver that energy instantly. A slow long-term power accumulation approach does not address the short-term need for energy in a burst of impulses. The issue here is the speed of the repetition, as well as the number of impulses.

4. A high capacity communication system, such as a UWB radio, can have its capacity shared by many simultaneously communicating nodes. However, this in term creates collisions and the difficult problem of resolving them; a problem that escalates with increased size of the network.

U.S. Pat. No. 7,180,421 by the inventors herein offers an architectural solution to the basic problem of energizing passive UWB tags. The '421 patent addresses the two first concerns itemized above. The invention described herein, among other things, solves the two last itemized concerns but, notably, also relaxes the requirements on the first two items as well, i.e. it saves power and increases process gain, which together enhance the total system performance markedly.

Even a traditional continuous wave radio, in which the main source of power output is the carrier signal itself, can greatly benefit from the application of the invention: Bursts of symbols are more power consuming than individual sporadic modulations and a better process gain can be achieved at lower bit rates. Furthermore, better collision protection and resolution can enhance the total performance of the system, regardless of the transmission technology. In particular, a backscattering system that does not need to generate its own carrier tone can use the invention to save power dramatically, enhance its performance, participate in massive interrogations, and still maintain a low circuit complexity.

The compression caused by the application of the invented MAC scheme is an additional compression inherent to its design and does not correlate to any data compression applied at other processing stages.

BRIEF DESCRIPTION OF THE DRAWINGS

In FIG. 1, the unique address information (8) is represented by the position of the signal and additional data is carried by the polarity of the baseband pulse.

In FIG. 8, are functionally identical to (P1), (K1), and (R1) in FIG. 7. The transponder P in FIG. 7 waited 47 $T_s$, e.g. 47×100 ns, before transmitting its (P1) impulse, and the transponder S in FIG. 8 chooses frequency slot 47 $F_s$, e.g. for $F_s$=1 kHz. It transmits a 47×1 kHz tone for a period of time that depends on the receiver's ability to scan all frequency slots, and thereby conveys the number 47. For the EPMA receiver, presence or lack of presence of the tone at frequency slot 47 is enough to infer whether the value is transmitted or not. Arrow (44) depicts the direction of the session resource that is time in this case, i.e. epochs follow one another along the time axis.

Figure 1:
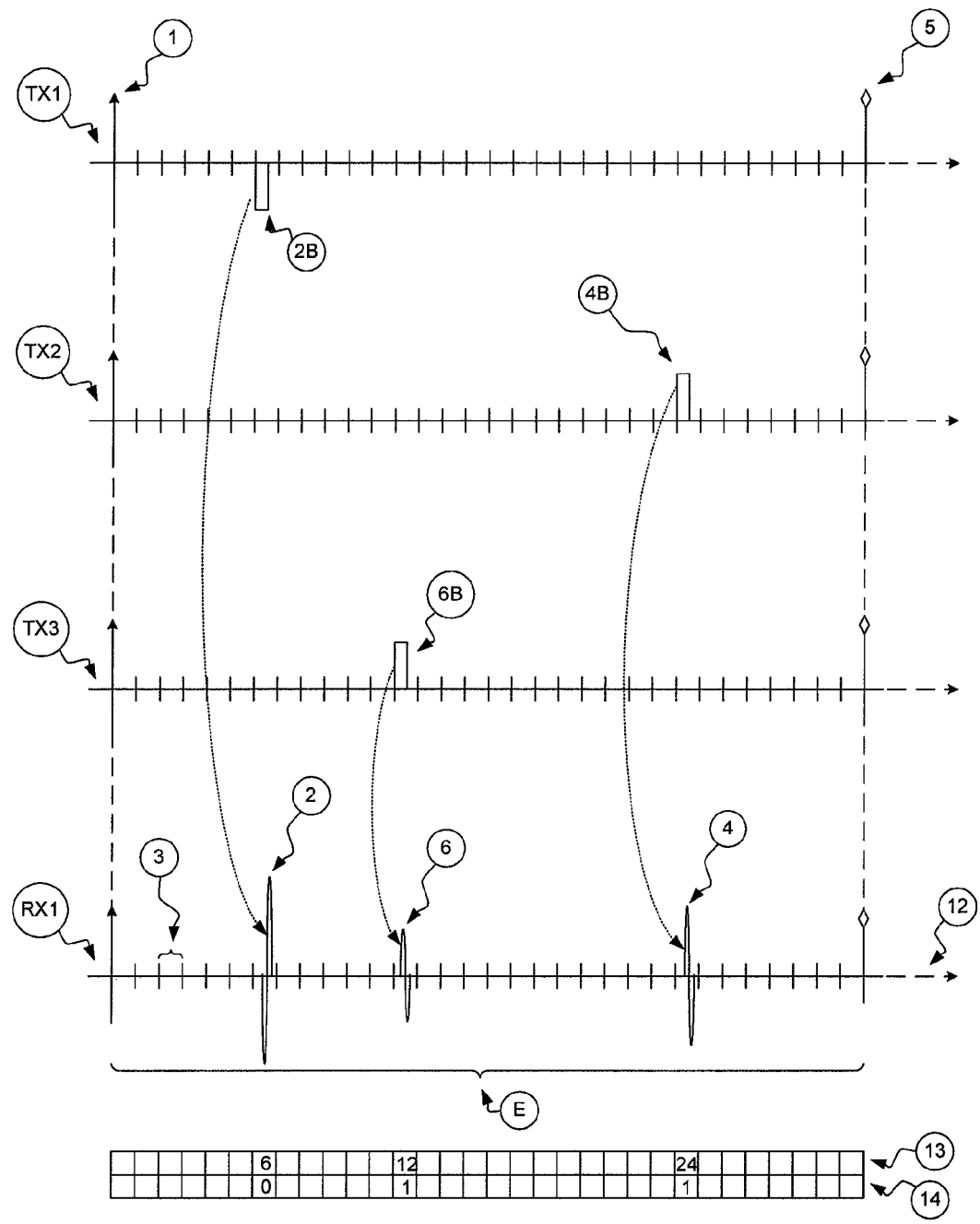
FIG. 1 illustrates the baseband level EPMA signal positioning of three transmitters (TX1), (TX2), (TX3) using EPMA in a single epoch and fully synchronously. Each transmitter starts positioning its baseband symbol from a reference or synchronization mark (1) that is commonly used in the network. Each epoch is composed of the number of slots (3) whose total number constitutes the base number for the EPMA value. A slot is the resource quantum in which each symbol is located and is considered as one number unit. Each epoch may be marked repeatedly (5) by the synchronizer, e.g. an interrogator to maintain stability, but in the particular case of a fully synchronous network, the shared clock can be provided by the same synchronizer and this shared clock can substitute the recurrence of the epoch synchronization flags as well. Each baseband pulse can be modulated to carry an additional value that here is dual: Depending on the interpretation of the polarity it could be a zero (5) or a one (6). The resource deployed in FIG. 1 could be time, frequency, code, etc. expanding along axis (7) or a combination of them.

By overlapping segments of consecutive EPMA values, here the rightmost hexadecimal nibble of previous value with the leftmost hexadecimal nibble of the current value, the receiver can infer what values can be linked to others. In this case, h87 in epoch (45) can link to h73 and h7F in epoch (46). In the next epoch (47), values h3B and h30 link to h73, while hF0 links to h7F. Finally in epoch (48), hB links to h3B and h0 links to h30 and hF0 from epoch (47). This linking procedure creates the graph in the bottom of the FIG. 9. In this graph, the set of chain of numbers listed in (49) constitute the possible formations. However, the formation (51) is a shadow value with a CRC equal to Z which is not among the CRC values received in (52). Chains in (50) confirm the available CRC values X and Y.

Figure 10:
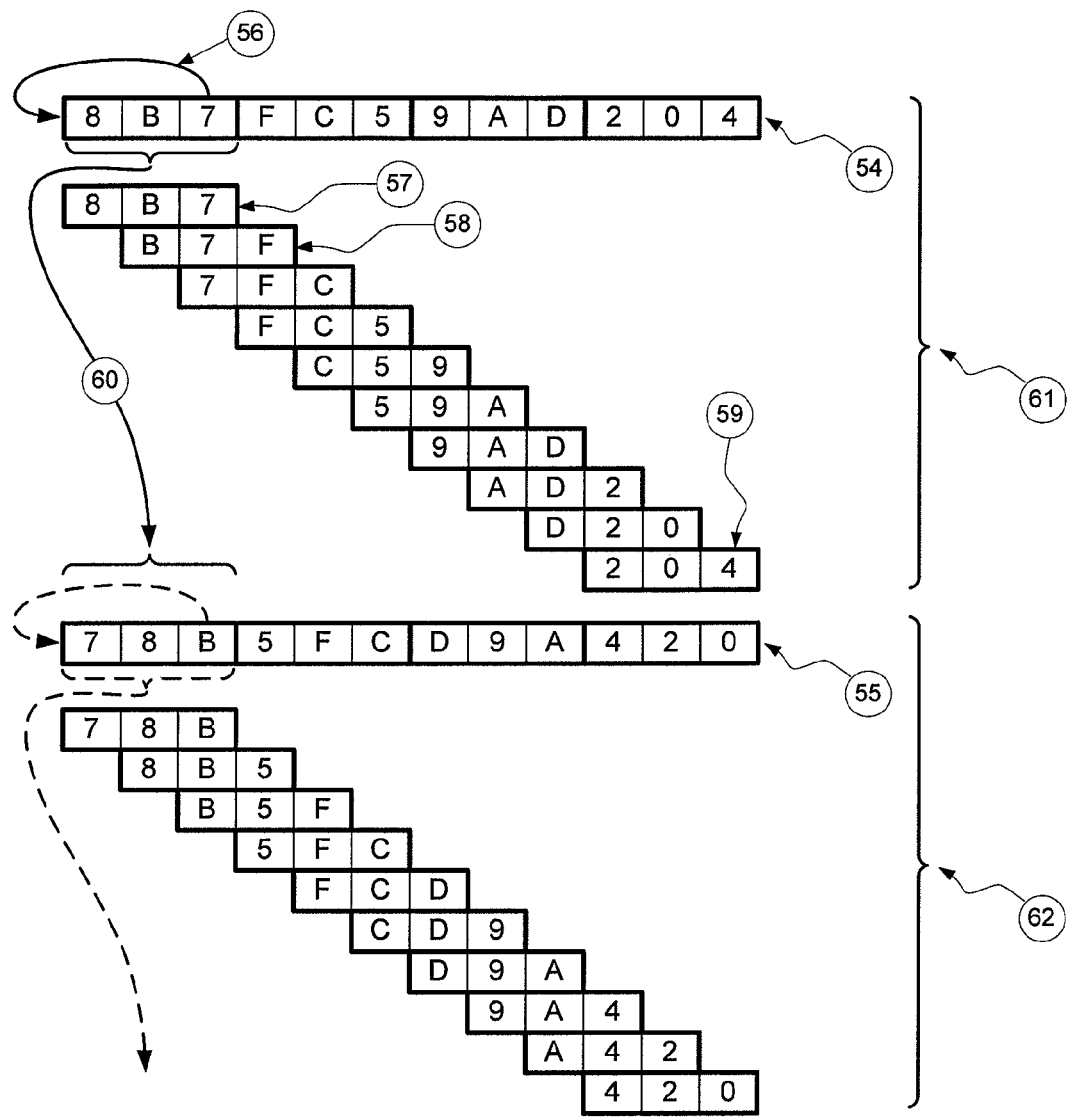

FIG. 10 shows a chain of numbers forming the unique data (54) to be transmitted in the first session (61) and its modification (55) in the following session (62). Each epoch value is a block of three hexadecimal numbers, e.g. (57), two of which are overlapped by the following epoch value (58). Once the chain of epoch values from (57) to (59) is transmitted, a new session begins. This time, the content of each epoch value is rotated one position, as in (56), and the new epoch value (60) is created. The new chain (55) generates a new set of ambiguities that probably do not occur at the same places as before and thereby alleviate the total amount of ambiguities.

Figure 11:
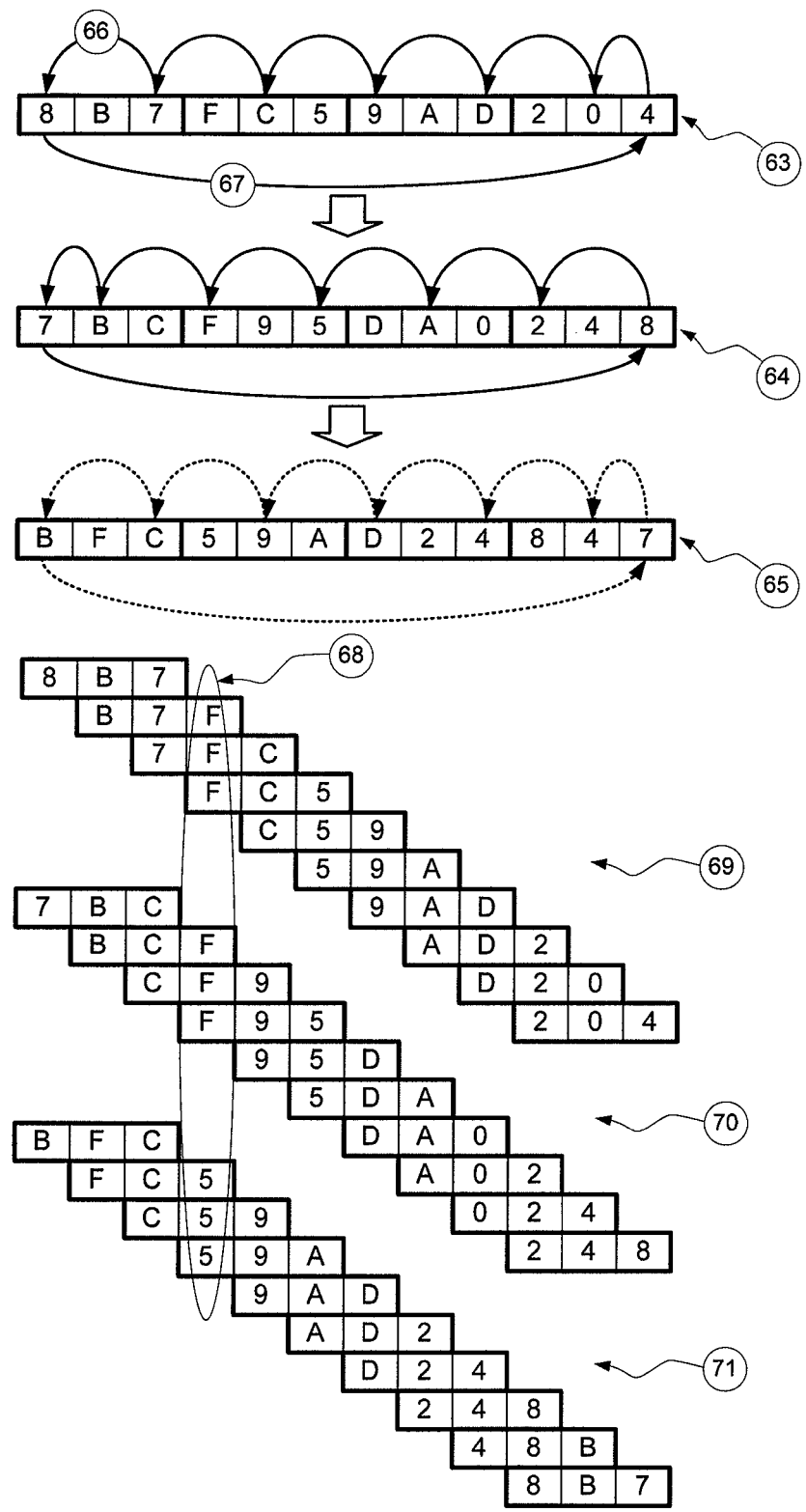

FIG. 11 is an example where the same chain as in FIG. 10 (63) goes through a local rotation of data (66) whose overflow (67) is fed back to the end of the chain, and thereby alters the whole chain and creates new chains (64), (65), etc. for following sessions. This way the chain takes much longer to repeat itself. The overlapping procedure in these chains is shown in (69), (70), and (71), where it is shown how an overlapped segment changes its content in the third session and thereby decreases ambiguity.

Figure 12:
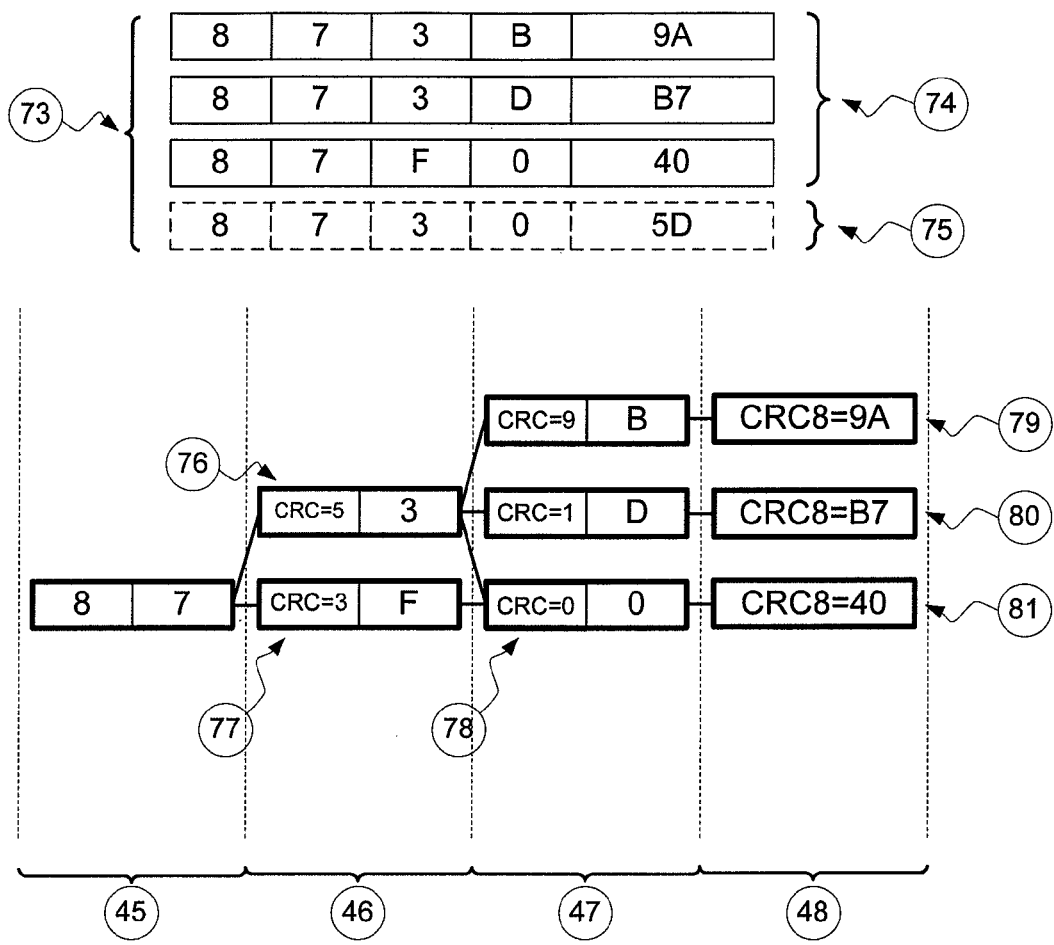

FIG. 12 shows three chains of unique numbers (74) transmitted by three transponders. Each transmitter is sending an 8-bit number composed of two hexadecimal numbers. In the first epoch, two nibbles of the UID are sent and, in the following epochs, one nibble of the UID and the 4-bit CRC of the chain up to and including that epoch are sent. The first epoch (45) contains value h87, the first two nibbles of all the chains in (74). The second epoch (46) contains two values; (78) contains a data load h3, and a CRC value of h5, while (77) contains hF and h3, respectively. Here, because the CRC for the chains h873 and h87F is different, i.e. h5 and h3, two branches are created in the graph. The graph continues to branch out at epoch (47), where the CRC values make it possible to have all the chains in (73). The last epoch contains 8-bit CRCs (79), (80) and (81) that result in rejection of the shadow value (75).

Figure 13:
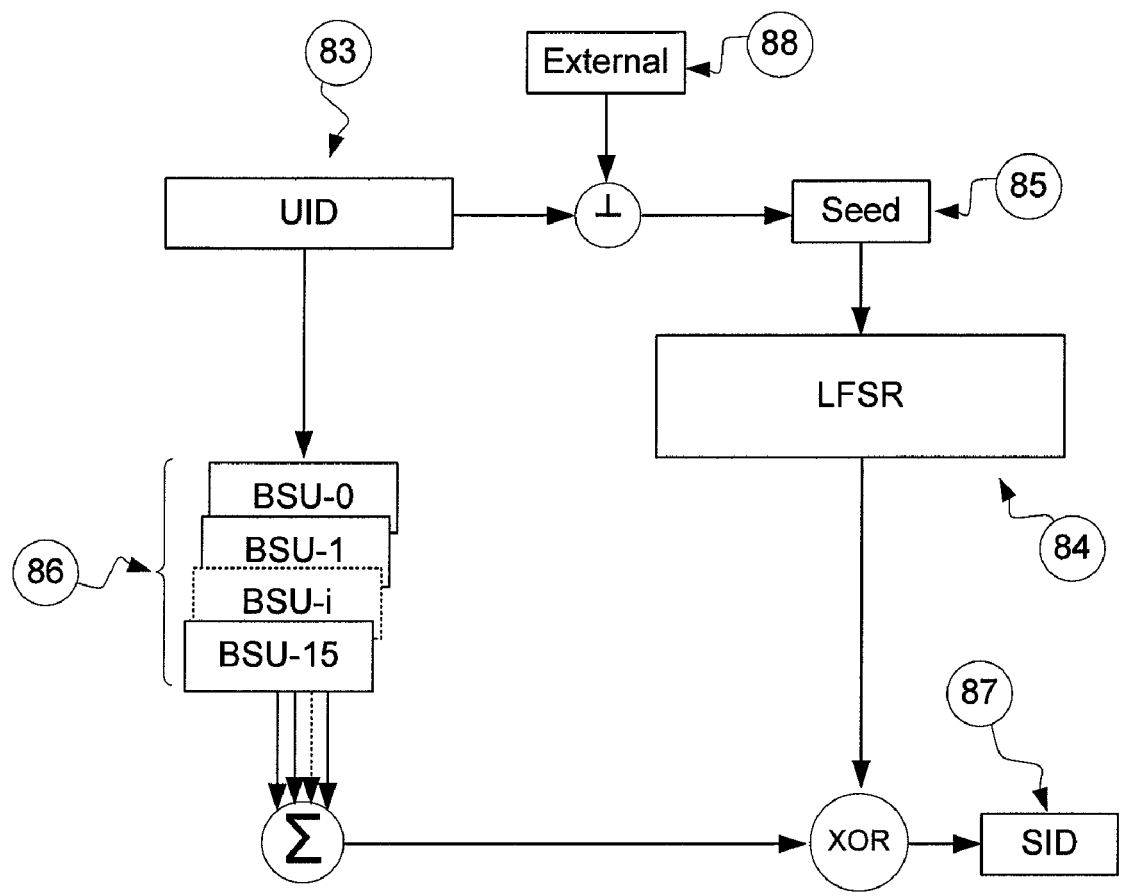

FIG. 13 shows a Linear Feedback Shift Register (LFSR) (84) that is used to generate a pseudo-random number (PN) based on a seed number (85) provided either by an external source (88), e.g. by a receiver or an internal source (83), e.g. permutations of the UID, data from internal memory, or a combination of the two. The uniqueness of the UID makes it an excellent source for generating a random identifier. However, because many massively interrogated items tend to have similar patterns in their UID, it is often a good idea to scramble their UID to alleviate the impact of repetitive patterns; (86) is therefore also arranged as a stack of UID segments that undergo a simple carry-free addition operation whose result undergoes an Exclusive-OR (XOR) operation together with the output from the LFSR. The output of the XOR operation is the Session Identifier, SID (87).

Figure 14:
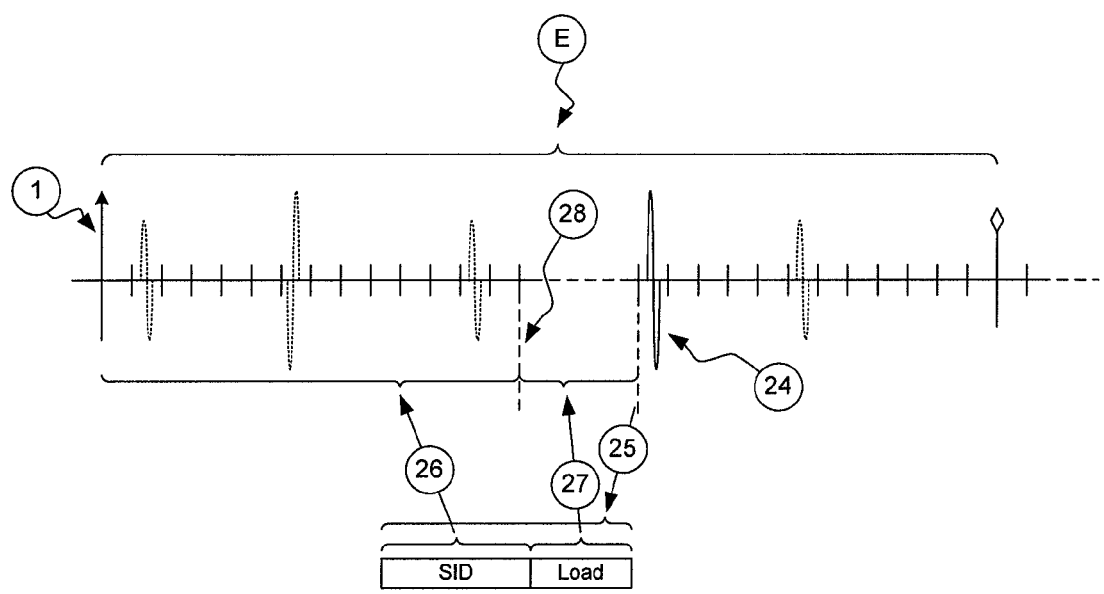

FIG. 14 illustrates how a short locally unique SID (26) deducted from the unique ID of a transponder in the network can be used to position its impulse (24) in a slot number (25) inside an epoch (E), representing a total EPMA value of (25) relative the epoch marker (1). The slot number (25) is composed of the position (28) determined by the SID (26) and the EPMA value of the load (27) relative (28). For this concept to work robustly, either the SID has to be unique to deliver data to known address, or the chain of data loads has to be synthesizable to a unique value to deliver transmitter addresses.

Figure 15:
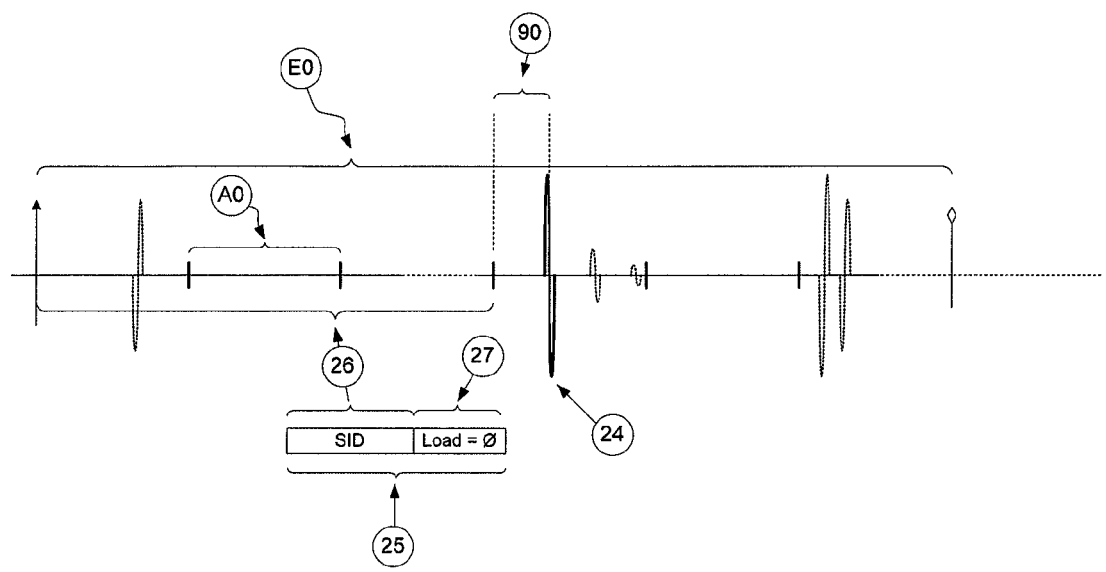

FIG. 15 illustrates how a SID-based EPMA system can be calibrated to compensate for channel delays. If all transponders transmit empty data loads (27) in the initial epoch (E0) then, because their data load is zero, the position of their transmitted symbol (24) only shows the bias caused by propagation delays and alike. The EPMA value represented by position (25) contains a SID (26) that causes the signal to fall into the field that belongs to that SID. This delay is inferred by observing where in the field the signal actually occurs, and the total channel delay (90) is captured. The field is as large as the largest EPMA value that can constitute the load. Hence, there is sufficient room to detect the delay of the signal. In a system with small timing inaccuracies, this delay is mainly due to propagation, hence the distance to the transponder can be directly inferred from it as well.

Figure 16:
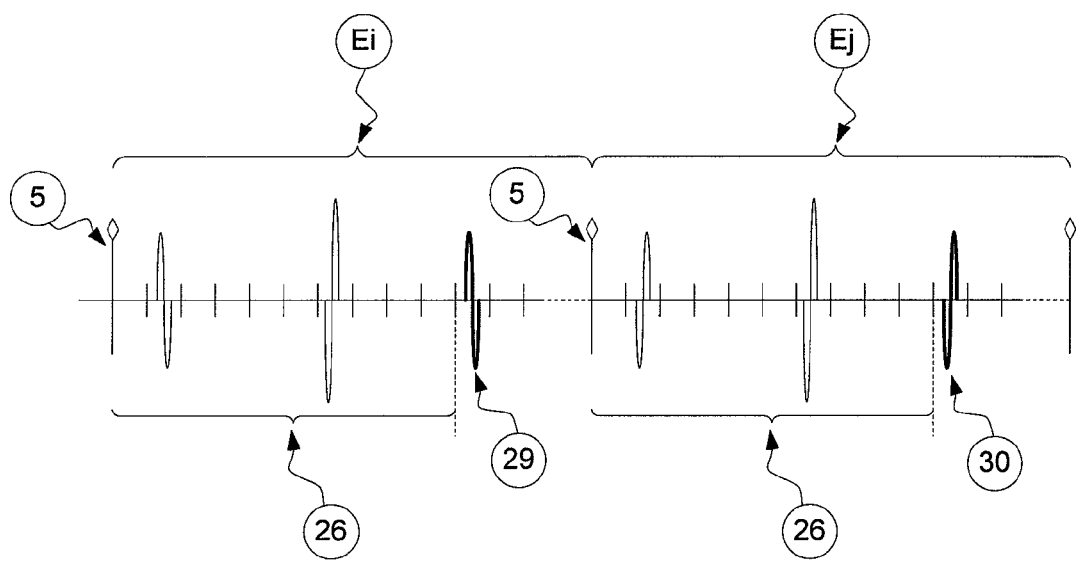

FIG. 16 shows a different approach to data communication under EPMA when compared to that of FIG. 14. FIG. 16 shows how the SID is used to determine a slot position (26) in two consecutive epochs (Ei) and (Ej). Each transmitter positions its impulse in its dedicated slot (26) inside every epoch during the whole session. The data is conveyed by traditional modulation inside the slot. All the benefits of EPMA are still in force because the impulses are intermittent and the sparseness leaves room for a massive number of other parties to transmit their data. Impulses (29) and (30), for example, belong to the same transmitter but are phased shifted by 180 degrees, which implies two different binary states for the signal, i.e. 1 and 0. The modulation benefit of EPMA is lacking and more symbols per bit are needed.

Figure 17:
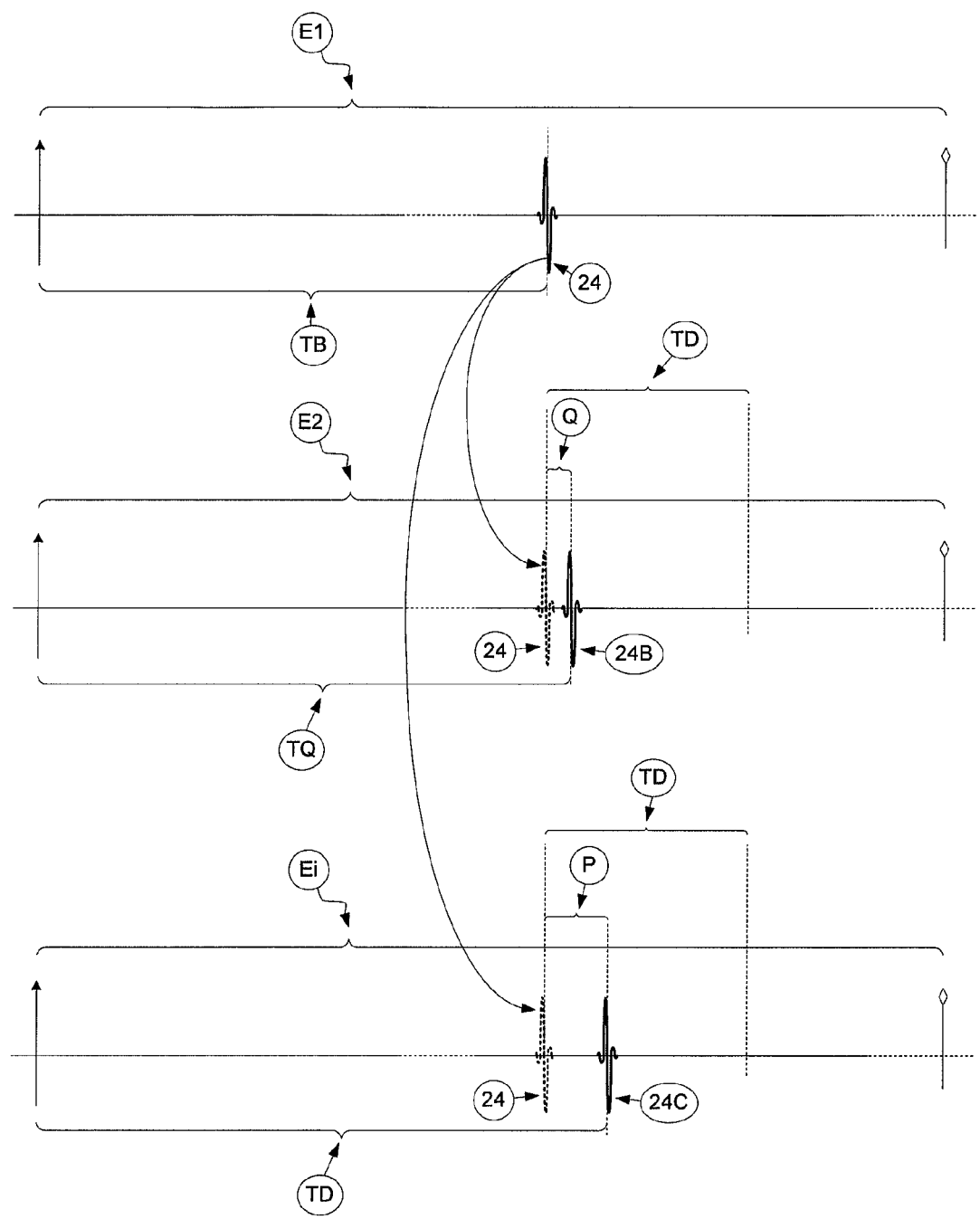

FIG. 17 shows an example of how EPMA can be applied to a network of asynchronous transmitters and receivers without using a shared system clock. (E1) and (E2) are the first and second epochs seen from the receiver, respectively. (Ei) represents any arbitrary epoch that follows (E2). During (E1), an impulse (24) is clocked to an elapsed time of (TB) seen by the receiver relative to a common epoch start reference. Each transmitter relies on its local oscillator, which is only nominally similar to that of another member of the network, including the receiver. Therefore, (TB) does not represent the same value for the transmitter and the receiver. Impulse (24B) in (E2) is dislocated relative (24) in (E1) by a known fixed amount (Q) that is used to establish the deviation of the transmitter oscillator from the receiver oscillator. (TT) is the space spanned by the set of possible data load values. That is, for an n-bit data load, it contains $2^n$ nominal slots. Following the calibration cycles in (E1) and (E2), an arbitrary epoch (Ei) contains an impulse (24C) that represents a position (TD). The deviation of (24C) from (24) in (E1) divide by the quantum (Q) unveils the data load presented by (24C) for the address presented by (24) in (E1).

Figure 18:
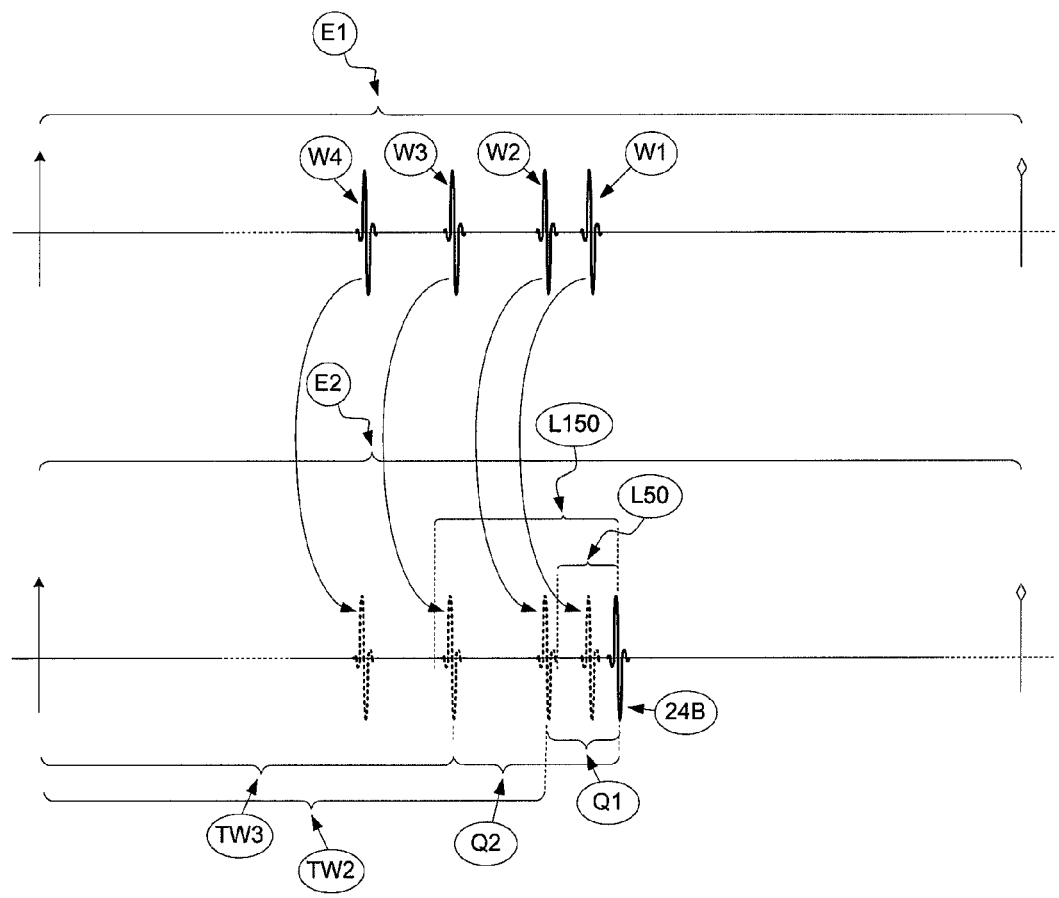

FIG. 18 shows a sequence of the first two epochs in an asynchronous setup where no common system clock is in use. Each transponder relies on its local oscillator that only nominally follows the frequency of the interrogator oscillator and, in practice, may deviate from it considerably. Under such circumstances, transmitters and receivers do not use a common reference for the symbol positions in an epoch and, from the receiver's point of view, the symbols seem as arriving randomly. The symbols (W1-4) in (E1) constitute a set of symbols that represent a data load of 0 as the symbols in (E1) did in FIG. 15. That is, each of these symbols indicate a SID, albeit with their own perception of positioning unit or quantum.

During (E2), as means of calibration, all transmitters put out a symbol containing a non-zero known and fixed data load; (24B) is one such symbol containing the data load 1. (L50) and (L150) represent the limits of deviation for the symbol (24B) inside which the matching candidates from the previous epoch could have occurred. In this case, (W2) and (W3) with zero data load positions measured as (TW2) and (TW3) fall inside the limits of viability. For either of (W2) or (W3) to match (24B), (TW2) or (TW3) must be whole multiples of the quantum represented by (24B).

DETAILED DESCRIPTION A PREFERRED EMBODIMENT OF THE INVENTION

An epoch is a communication resource space that can position any number whose base is equal to or smaller than the size of the epoch. The invention provides a technique referred to as Epoch Position Multiple Access (EPMA). Communicating units often use a unique number as their identifier, e.g. a Medium Access Control (MAC) address or an Internet Protocol (IP) number. This unique number allows for all parties to identify the source or destination of the communicated information unambiguously. EPMA takes advantage of the uniqueness of this identifier or address as means of avoiding collisions, while transmitting as few symbols as possible.

In EPMA, all communicating parties broadcast their data using one or several shared media resources, such as time, amplitude, frequency, phase, code, etc. whose allotments uniquely depend on the unique address of the communicating node. Each node transmits its data in a medium resource slot dedicated to that particular transmitted data value. These slots are quanta of an epoch, each of which is dedicated to a unique number among all possible values. For example, assume that there are 32 possible communicating nodes, each having the unique ID numbers 0-31. This situation is illustrated in FIG. 1. In FIG. 1, four rows of epochs are illustrated. The first three rows relate to three transmitters (TX1), (TX2), (Tx3) and their respective baseband level epochs and signals. The fourth, i.e. the lowest row, shows the idealized epoch as seen by a receiver (RX1) assuming that a baseband pulse in each transmitter corresponds to propagating a Gaussian monocycle with no distortion in the propagation path. The epoch (E) is 32 slots large and each transmitter can, by transmitting a single symbol in the slot corresponding to its unique ID, announce its value and its presence in the network. If the node's unique ID is e.g. 24 as in (4B), then transmitting a single symbol occupying slot number 24 suffices to convey the information that number 24 is present. Here, the value 24 is delivered to the receiver by that particular transmitter accessing the communication resource in parallel to other transmitters. Still, the impulse representing the value 24 could itself be modulated by means of traditional modulation techniques to deliver additional information that can be a part of the original information, e.g. a remaining piece of the ID number or data from that source, e.g. data that a transmitter with that ID is requested to propagate. In this example, (2B) carries the EPMA value of 6, but its symbol carries the modulated value 0 as well. This adds an additional bit that could double the range of the value to 6 or 12, depending on the polarity of the single bit modulation, or it can be the ID 6 and data 0, or any other combination that is agreed upon between the transmitter and the receiver. This additional on-symbol modulation can strengthen EPMA and give it additional efficiency and performance boost. This dual modulation is put forth at this early stage of explanation for EPMA to elucidate a fundamental difference between EPMA and traditional modulation and access methods. In EPMA, all symbols have the same reference in the resource space and their modulation, as well as access method, is defined by this very position in the whole space. In traditional methods, each signal has its own slot and its modulation occurs inside that slot and, notably, is unrelated to its access method.

In the example of FIG. 1, the set of numbers to be communicated varied between 0 and 31, and subsequently, an epoch size of 32 was necessary. The mentioned symbol is not necessarily a single baseband symbol or code. A symbol could comprise any set of a complex combination of signals. However, a baseband pulse principally suffices to serve in this example.

In conventional digital data communication, data is typically presented by a number in the smallest numerical logic base, i.e. binary. In Pulse Position Modulation (PPM), as described in ISO 15693, the signal position inside the time slot determines its value, but for a limited value range and for a single element. In trinary logic, a trinary constellation is used, but for discerning two states. In EPMA, this value is presented as a number whose base is conversely large, typically the largest possible base in the frame of reference, i.e. the size of the epoch and this base is shared by many pulses simultaneously.

Because each node puts out a unique value between 0-31, data transmission for each node claims a dedicated slot and, principally, no collisions can occur in the 32-slot wide epoch.

This approach as explained up to this point, suffers from two fundamental problems:

1. A large address number, e.g. a 128-bit address such as an IP-address, requires an unmanageably large epoch size. In this document, this problem is called the Sparse Space Problem (SSP). The space spanned by $2^{128}$ slots, for simultaneous use of $2^{128}$ potential members in the network, constitutes an impractically large address space which subsequently remains sparse and under-used.

2. Communicating devices often do not only communicate their unique addresses and do not only announce their presence, but do so as an initial step in further communicating their non-unique arbitrary data. In the following, this problem is called the Arbitrary Data Problem (ADP). As opposed to unique IDs and addresses, arbitrary data can represent any number and value which can cause uncontrolled collisions.

Under EPMA, these issues are addressed satisfactorily. SSP is addressed by exploiting the ultima-uniqueness of the segments of the values to be communicated. ADP is addressed by exploiting the uniqueness in the already collected identifiers.

The Sparse Space Problem (SSP)

Figure 2:
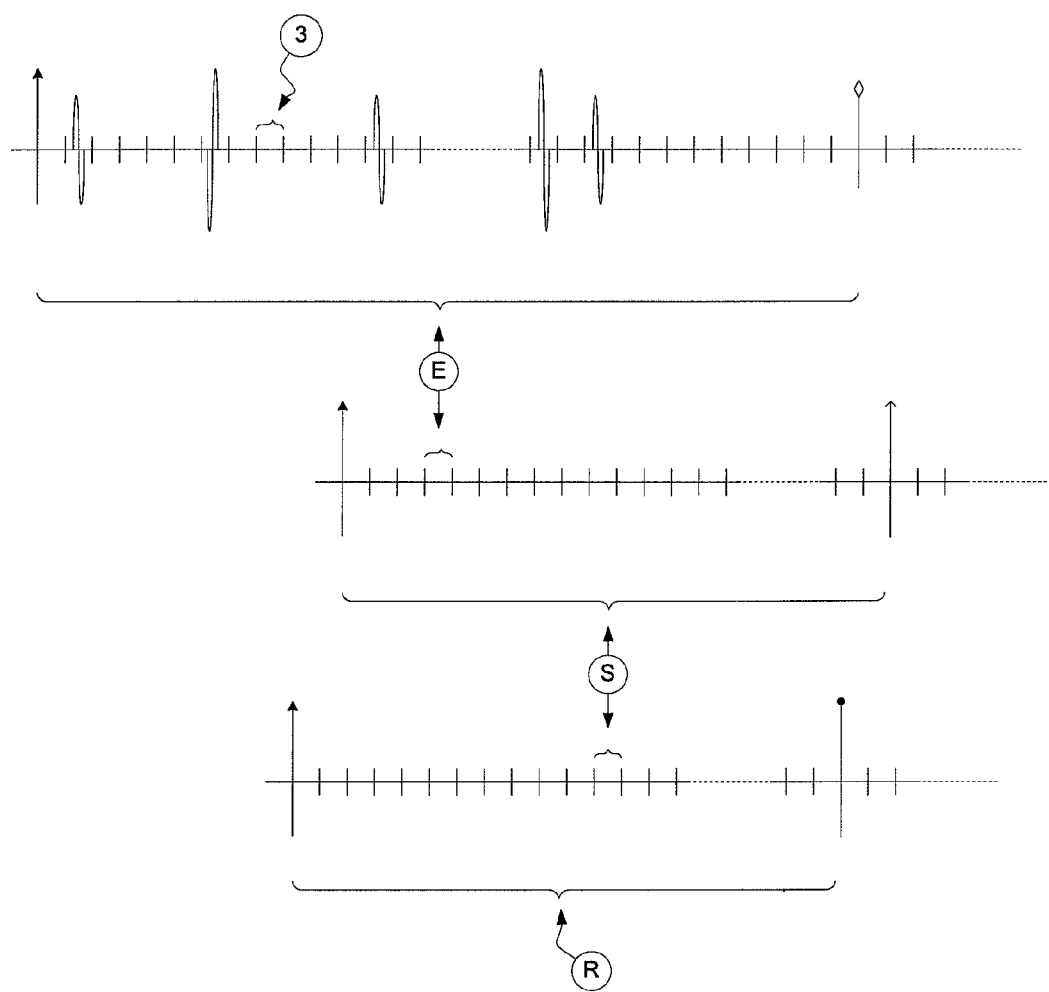
FIG. 2 illustrates the epoch→session→round hierarchy. At the top level, a slot in an epoch of a receiver is shown. An epoch (E) is shown in the context of a session (S) and a session is shown in the context of a round (R).

Instead of transmitting the entire unique number, 128 bits in the example, in a single epoch, one could transmit a different presentation of that large number. One could, e.g. transmit smaller numbers that can be used to reconstruct the larger number. By using smaller numbers, the epochs become smaller and the epoch size can be adapted to the expected number of network elements. Long IDs/addresses, such as the 128-bit example here, are typically used as IP numbers, RFID tag identifiers, MAC addresses, etc. An identifier/address is per definition and, in the context of its application, a unique number. If this number is divided or in some other way rearranged into a set of e.g. 12-bit segments, each of the 12-bit segments is propagated in a 12-bit epoch comprising $2^{12}$ slots. In a multi-access network, where many elements in the network are transmitting simultaneously, corresponding symbols in respective epochs must be linked to reconstruct the final 128-bit long unique number. The set of all of the epochs needed to link all the segments and to produce the final unique numbers forms a session. After one session, assuming no ambiguities and collisions occur, all of the unique numbers transmitted from different elements of the network are acquired. The exact number of epochs needed to form a session depends, among other parameters, on the algorithm used for linking the chains or inferring the unique number and the expected number of simultaneously transmitting parties. Finally, repeating the sessions with unchanged or altered parameters can increase the confidence in detection and correctness of the received values. The set of all the sessions needed for reconstructing all of the 128-bit unique numbers with a certain confidence is called a round, e.g. in the case of inventory management, an inventory round. FIG. 2 illustrates the epoch→session→round hierarchy. At the top level, a slot (3) in an epoch of a receiver is shown. An epoch (E) is shown in the context of a session (S) and a session is shown in the context of a round (R).

Linking the symbols in different epochs constitutes the core of the problem of recovering data in EPMA. The data to be transmitted, initially the unique ID, can be segmented in many ways. The segments do not need to be consecutive or even directly be a portion of the data. For example, the segments can be patches that overlap each other and can be linked to one another through matching the overlaps, they can be mere codes that, when properly combined together by an algorithm at the receiver end, can be processed to produce the final data, or they can be smaller numbers, each labeled by a local identifier, that is eventually used to link the related numbers to one another.

Figure 3:
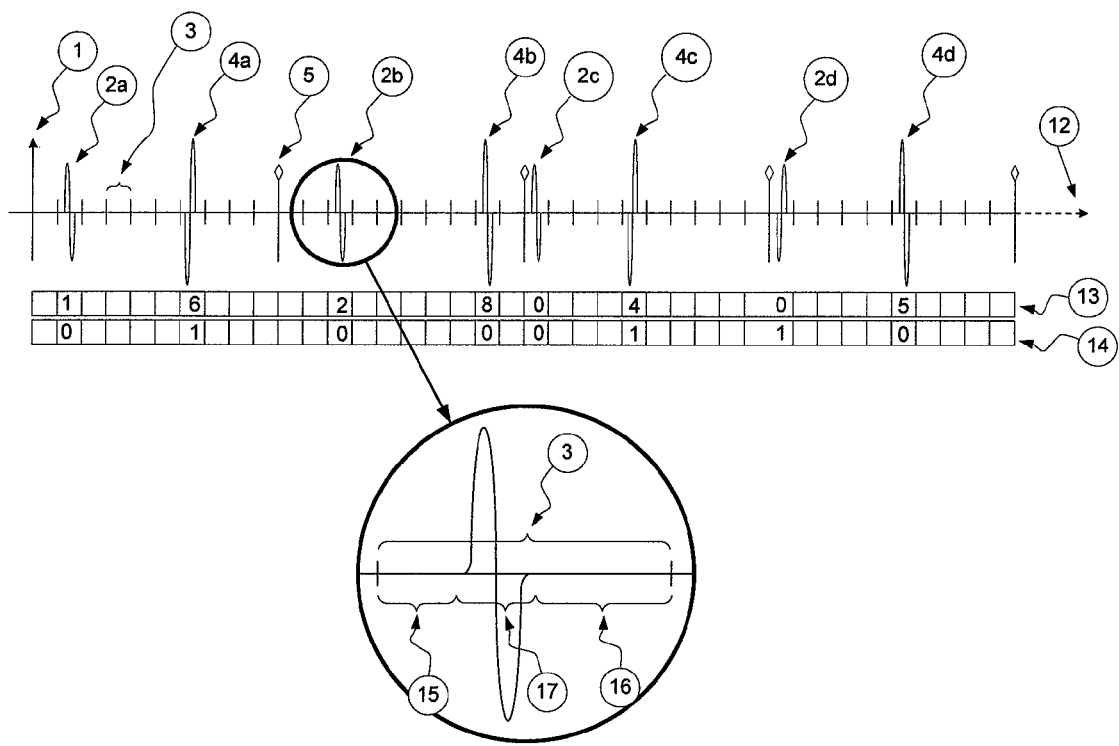
FIG. 3 shows the details of some important elements of a receiver using EPMA in a sequence of four epochs using (5) as epoch delimiter. Each epoch comprises ten slots (3) in which impulses (2a), (2b), (2c), and (2d) represent non-unique segments of a unique number from one transmitter and impulses (4a), (4b), (4c), and (4d) from another transmitter. The frame starts with a reference signal (1). Axis (12) represents the magnitude of the shared resource. The EPMA values of the impulses are noted in register (13). Register (14) carries the phase value of the impulses as an additional piece of information caused by traditional phase modulation. Impulse (2b) is enlarged to show further details about how its position in the slot can be shifted with respect to the beginning of the time slot (15). When this slot represented a timeslot, this shift stems from the propagation delay that, among other things, is caused by the distance between the transmitter and the receiver. A phenomenon that is depicted for different corresponding slots, affects the signal strength as well. The pulse width (17), or the symbol size in the general case, along with the remaining buffer zone (16), occupies the remainder of the slot size.

FIG. 3 shows the details of some important elements of a receiver using EPMA in a sequence of four epochs (5), each comprising 10 slots (3) in which impulses (2a), (2b), (2c), and (2d) represent non-unique segments of a unique number from one transmitter and impulses (4a), (4b), (4c), and (4d) from another transmitter. The frame starts with a reference signal (1). Axis (12) represents the magnitude of the shared resource, i.e. if the resource is time the time is elapsed along (12) or if it is frequency, it is varied along (12). FIG. 3 provides an idealized scenario where impulses come from different distances and their signal strengths are different. Based on the reading of the signal strengths, (4a), (4b), (4c), and (4d) are likely to be transmitted from one source, while (2a), (2b), (2c), and (2d) belong to the other source. The EPMA values of the impulses are noted in register (13). Register (14) carries the phase value of the impulses as an additional piece of information. Impulse (2b) is enlarged to show further details about how its position in the slot can be shifted with respect to the beginning of the time slot (15). If this slot represented a timeslot, then this shift would stem from the propagation delay that, among other things, is caused by the distance between the transmitter and the receiver; a phenomenon that, as described earlier, affects the signal strength as well. The pulse width (17), or the symbol size in the general case, along with the remaining buffer zone (16), occupies the remainder of the slot size. The epoch values carried by e.g. (4a), (4b), (4c), and (4d) are according to (13), the numbers 6, 8, 4, and 5, respectively, while the phase modulation of the impulses are 1, 0, 1, and 0 respectively. The session value is a synthesis or linking of these epoch values.

There is a host of different ways to implement symbol synthesis/linking, and depending on application, some may prove more efficient in terms of speed, cost, data rate, robustness, security, etc. than others. Depending on how linking is performed, the characteristics and complexity of the information recovery process varies. For example, if the subsequent symbols carry an overlap of the former symbol value, the segments are easy to generate on the transmitting side, but the amount of ambiguities on the receiving side can amount to considerable complexity. If simpler shorter identifiers are used, the transmitter and receiver both become simple, but the number of sessions required to resolve ambiguities can increase, which results in a lower practical data rate. If pseudo-random codes are used to distinguish between groups of symbols, the robustness and security of the link increases at the cost of additional complexity on both the transmitter and the receiver ends.

Because epoch values are not unique numbers, there is a probability that several symbols fall in the same slot, a symbol collision that causes ambiguity in linking the symbols. Technically, this is not a collision because the value is right and recoverable, regardless of how many transmitters send it, but the similarity of the values causes ambiguity in linking. For example, two or more sources that each ultimately have different IDs can still share a common segment of those IDs that, when transmitted from all of them, falls in the same slot. These symbols may or may not position themselves in different locations in the slot, but their reflections do so, albeit at a lower strength.

Figure 4:
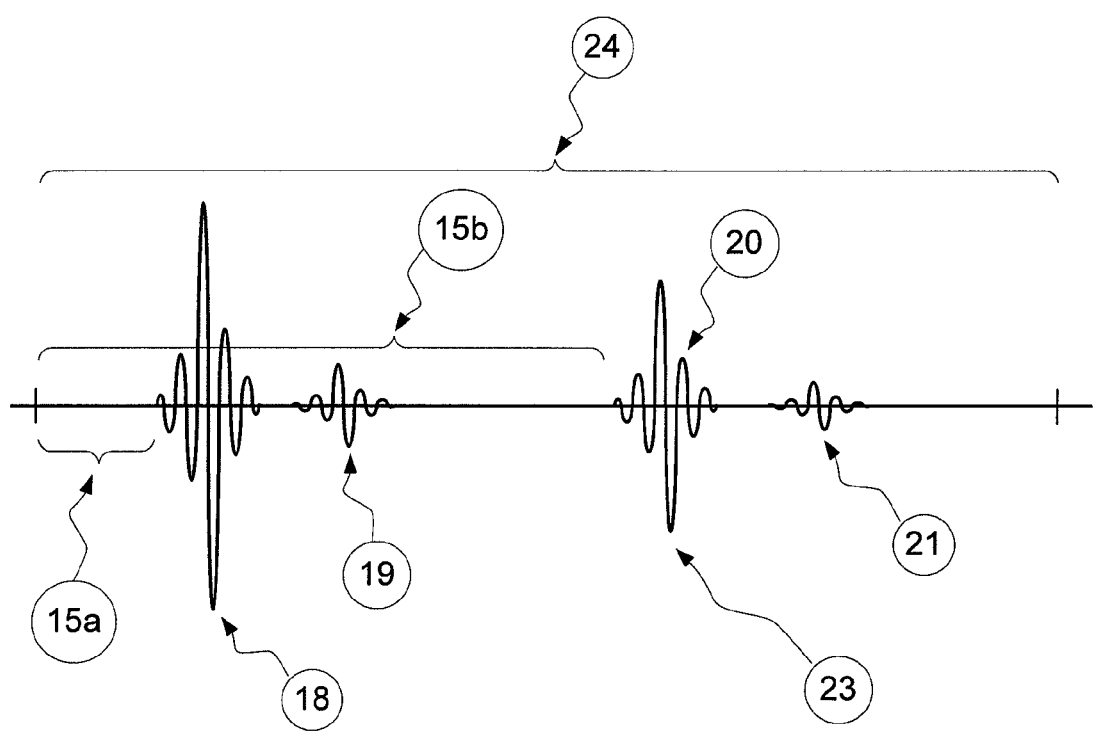
FIG. 4 shows details of a time slot (24) in which two impulses (18) and (23), along with their respective reflections (19) and (21), are considered. The difference between (15b) and (15a) are, again among other things, representative of the distance between the location of the receiver from the emitting sources of (18) and (23). A simplified first degree illustration of signal reflection patterns is also shown in (19) and (21).
Figure 5:
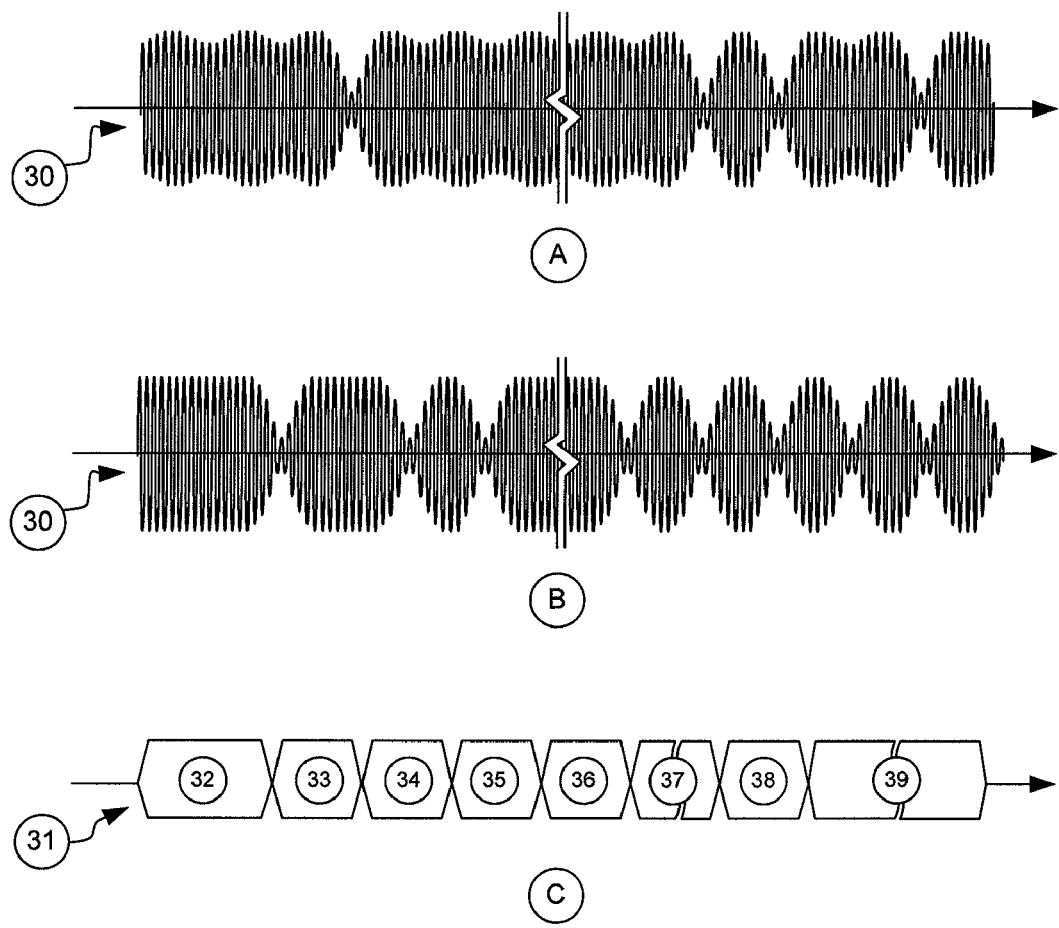
FIG. 5A shows an example of an interrogator signal in the downlink direction energizing a transponder and providing it with commands/data and system clock with amplitude modulation. In this case, system clock is implemented with a smaller modulation depth and data with larger modulation depth.
FIG. 5B embodies the case where the clock and data are modulated at the same depth, but data can be distinguished from the clock through missing clock notches.
FIG. 5C (31) depicts the protocol flow used in this particular case. The communication starts with a period of clock modulated continuous wave propagation (32) to power up the transponders. Next, a preamble (33) prepares all transponders for incoming command (34). The command is followed by a data segment (35), depending on the command. As means of verifying data integrity, a Cyclic Redundancy Check (CRC) number (36) is finally sent at the end of the data segment. Immediately afterwards, or after a certain period of time if any synchronization delay (37) is needed, a synchronization sequence (38) is transmitted that marks the start of the first epoch of the first session of a round. Once the start of the session is announced, the continuous wave with modulated system clock (39) continues its broadcast, if so required.

FIG. 4 shows details of a slot (24), here a timeslot representing a quantum for the time resource, as opposed to (3) in FIG. 3 that was a quantum for a generic resource. In FIG. 4, two impulses (18) and (23) along with their respective reflections (19) and (21) are considered. The difference between (15b) and (15a) are, among other things, representative of the distance between the location of the receiver from the emitting sources of (18) and (23). This distance and the subsequent relative dislocation of the received impulses in time can be used to resolve the ambiguity partially and distinguish between the sources, especially because this dislocation works in tandem with variations in signal strength as well.

Other phenomena in RF propagation effect similar impacts on signals and can be used as means of characterizing signal source, e.g. the path of propagation and its pattern of deterioration which can, in turn, help distinguish the signals from one another. The reflection patterns, such as (19) and (21) in FIG. 4, can be used for matching signals. Doppler effect, which is the shift in frequency due to changes in motion, can be mentioned as another such phenomenon. These techniques are not always applicable or reliable. The linking algorithm should therefore and in principle be tolerant of such ambiguities and use all the mentioned techniques only as means of enhancing the performance.

The Arbitrary Data Problem (ADP)

Many applications, e.g. RFID and inventory management, often aim only at recovering the Unique IDs of the transponders and are satisfied by reconstructing these unique numbers at the end of the inventory round. However, some other applications require a complete cycle of communication where the recovered unique addresses are used to establish unique links for data communication. Once the unique address for each communicating node is known, the network configuration is mapped out and all the elements of the network can be directly and uniquely accessed. The fundamental hurdle, i.e. the unique address of each member, is overcome by the application of EPMA. Depending on the approach used in establishing the communication link from this point on, different elements of the network can communicate individually, group-wise, or massively.

For individual access, an interrogator can use a SID that has proven to have been unique during a current round, or even the unique identifier (UID) of a specific source to acquire data from it. In this case, the respondent can put out its data without padding it with its identifier and as a sequence of symbols whose values are represented by the position of the symbols inside the epoch and/or any extra legacy modulation of the symbol. Because the interrogation is one-on-one, there is no need for embedding linking information inside the symbol values. They can be consecutively linked together.

For massive or group-wise data communication, the data however must be linked and their source identified. This stage of communication imposes the same power, density, and bandwidth constraints on the communicating nodes as broadcasting the unique addresses/IDs did. Hence, EPMA's fundamental features remain advantageous to massive data communication as well. Massive data communication refers to a scenario in which a massive number of transmitters simultaneously deliver their data to the receivers in the network. In the same way, the segments of the unique IDs are massively communicated, under EPMA, it is also possible to communicate any other kind of data massively and simultaneously between all elements of the network.

Such arbitrary data transmitted by the members of the network, as opposed to their previously communicated IDs, are no longer unique at any length. That is, two transponders can transmit two completely identical numbers, which means every single symbol representing their value can fall in the same slots. However, because the ID interrogation phase makes all currently participating elements of the network known to a receiver, in principle the link resources can be distributed so that each communicating party acquires an inside-current-network-and-round unique, inside-some-session unique or, with less effort, a quasi-unique session ID, SID, with which it can tag its data in each epoch. The SID is considerably shorter than the UID because the latter spans the space of all possible ID numbers and the former spans the space of present elements in this network at this time.

Equipped with SIDs, signals can find unique or at least quasi-unique positions inside an epoch and the concept of session transforms to the set of all the epochs needed for all the transmitters to deliver their data.

Key to the idea here is to use the retrieved unique IDs or addresses to generate a temporary ID, valid through the data transmission period for the current network configuration, that is short enough to warrant for efficient tagging of the data packages, but long enough to ensure uniqueness among the current population of the network members.

SIDs can enable a receiver to distinguish between the sources of the incoming data. As with massive retrieval of UIDs, massive data communication under EPMA can be done in many different ways as well and is not limited to the SID approach. Each node in the network can, e.g. use its SID as an identification tag for its data signals; it can use the SID as a dedicated slot number in which its signals are transmitted; or it can use the SID for generating codes for direct spreading of the data inside the frame of communication, as is done in Direct Sequence Spread Spectrum communication.

In-depth description of data communication by SIDs is disclosed as two embodiments later in this document. Regardless of the access and modulation techniques used, because the number of members in the network can vary drastically, it is crucial to have an optimal SID and epoch size, i.e. sizes that match or adapt to the number of participating members in the network. Too large an epoch results in unused resources and too small an epoch makes it hard to find unique SIDs. The techniques used for congestion detection and network size prediction in the process of retrieving UIDs help decrease the amount of ambiguities by properly dimensioning SID size in this case and epoch size in the general case. In retrieving data, however, the receiver has all the knowledge about the number and identity of the participating parties in the network and can beforehand verify whether there are any ambiguities and use that information for sizing the epoch and SID.

Enhanced Link Security as a Consequence of EPMA

The integrity of the system described herein is based on a number of factors that can enhance the security of the link. Each transmitter generates a sequence of numbers that appear uncorrelated, unless the linking parameters and the references for the values are known. The amount of overlaps between EPMA values, the CRC polynomials, the pseudo-random numbers that are involved in generation of the SIDs, and the reference that flags the start of an epoch are among these factors.

A good candidate for link security is the SID approach. The pseudo-randomness of a SID makes it hard for an interceptor to link the signals to each other and subsequently infer the final value. In addition to this the reference flag which can be characterized as a sequence of bits transmitted by the enquirer, adds to enhancing the Low Probability of Interception (LPI) in the link. The composition and/or sequence of this flag can be a shared secret whose sequence and meaning, in terms of how to start and when to start, is only known to the trusted members of the network. Knowing this sequence makes the timing accurate, especially because no sequences, thanks to the continuous change of the SID, repeat systematically. Even a single slot deviation ordered by the reference flag can cause a total scrambling of the data.

A symmetric encryption approach, such as the shared secret approach mentioned above, is never as good a solution as an asymmetric approach, such as a public and private key or elliptic encryption. However, it comes for free as a consequence of EPMA and, because EPMA is applicable to any link, this approach is applicable to any communication link using EPMA as well. The latter is significant in the light of the fact that using a time domain link, such as UWB radio, per se offers a minimum level of protection against interception, but other medium use technologies do not enjoy the same features that UWB offers.

More complex encryption techniques scale up in complexity as their keys increase in size or in any other way elevate the level of security. A combined LPI offered by EPMA and an asymmetric encryption approach with lower complexity can offer a very comfortable level of protection.

EPMA applies to any communication link because it is based on positioning of a symbol in an epoch, whose size determines the number base of the symbol value, and that can be a segment of any physically or logically available medium resource. Examples of such resources are time, code, phase, amplitude, and frequency spaces and their combinations.

There are a number of characteristics that make this approach especially suitable for low power massively communicating networks and, in particular, those transmission technologies where the instance of transmitting the symbol itself requires relatively high amounts of power. UWB impulse radio is such a technology. Another class of applications of low power radio is sensor networks and Radio Frequency IDentification (RFID), and the class of passive radios where the power needed to run the circuitry is scavenged or recovered from the incident signal. Although passive and active low power UWB radios, including RFID and sensor networks, are the ideal candidates for this algorithm, this approach remains applicable to all kinds of communication links, including the wired ones. An especially suitable application of this invention is item-level RFID, where RFID tags are deployed in massive numbers to enable tagging any and all items and to interrogate them en masse quickly and robustly. Some of the mentioned characteristics are:

An RFID tag has a unique ID: A unique ID combined with EPMA can theoretically yield collision-free communication between massively and simultaneously broadcasting tags, which results in a quick and reliable turn-around.

EPMA is effectively a compression technique; in the most extreme case, a single bit represents the whole data content of the tag. This results in decreased bit-rate and increased range.

Tags are typically extremely primitive and incapable of listening to others' traffic which, in turn, makes them incapable of knowing when to send their data to avoid collision. Hence, their transmissions do collide, which behooves frequent external involvements by the reader. A nearly deterministic approach, such as EPMA, saves the overhead caused by the reader involvement in the process of conflict resolution by selective communication.

Data encryption is a major concern for any communication link, especially those carrying vital information. RFID tags are ubiquitous, simple devices that often carry private or security-sensitive data. Encrypting RFID tag data very often calls for a reasonable level of security. Such a level of protection against interception is inherent to EPMA.

Introducing EPMA to an Impulse Radio communication system offers additional benefits that are fundamentally significant: Without these benefits, a useful long range passive Ultra-Wide Band Impulse Radio (UWB-IR) technology is not currently feasible. These additional benefits include:

UWB-IR is a carrierless radio. It does not require a continuous wave carrier signal and the impulse itself carries all the complexity in terms of impulse shape, including its wavelet form, needed to position it in the frequency and time domains. Consequently, transmission power is dissipated only when the impulse is generated and propagated. That is, the frequency of the occurrence of the impulses has a direct and crucial impact on the power consumption and energy conservation of the tag. The fewer the impulses are, the less power the transmitter needs. In particular, a passive radio's energy reservoir becomes smaller. Because EPMA can use a single intermittently generated impulse to indicate a position that represents a large number, application of EPMA can decrease the power dissipation of the transmitter stage markedly, compared to a regular UWB-IR radio, while avoiding time-consuming collisions, decreasing circuit complexity, and increasing range.

In particular, under notable occurrence of multipath and detuning problems, decoding impulse values by finding their position in the time domain is a much less daunting task compared to symbols modulated on continuous waves because impulse radio is more resilient to path fading. Impulses are easily distinguishable from their multipath reflections.

EPMA resolves its ambiguities by the virtue that the tag continues to transmit new sessions of epochs with its data segments coded into new different values, while a UWB radio achieves process gain by pulse repetitions which are preferably random. These schemes both fit well together and result in robust data communication at minimum overhead.

Several Embodiments of the Invention

In the embodiments described here, the downlink and uplink (reverse link) are treated separately. There is no reason for these two to be similar or even implemented with the same link configuration, frequency band, protocol, etc. The requirements on these links are typically different, which often calls for different solutions for each of them. For example, an interrogator trying to communicate massively with a large number of tags typically broadcasts an inquiry command to all of the interrogated devices and suddenly receives a massive response. This asymmetry in communication could be addressed by deploying an asymmetry in link configuration, modulation, access, frequency band, etc.

Consider FIGS. 5A, 5B, 5C and 6 as two downlink embodiments for interrogators whose objectives include simultaneous scanning of the identity of a population of the transponders around them.

Each such interrogator communicates with the transponders by providing them with a common system clock and a set of commands to initiate and control the flow of communication. FIG. 5A shows an amplitude modulated continuous wave narrowband signal that carries the clock information shared by the network at a smaller modulation depth, but command and other data at larger depth. Although it is not a matter of direct concern for this embodiment, in a low power transponder, e.g. a passive RFID tag, such a continuous wave in downlink can actually be used to provide the transponders with RF energy to power them up fully or partially. Among other things, the transponder transmits its UID and data to the interrogator. The clock modulation provides a system clock to all members of the network and the deeply modulated data on the continuous wave signal provides the transponders with information and commands needed to establish and control the information flow in the network. FIG. 5B illustrates a similar approach, where data and clock are modulated at the same depth; the data is distinguished from lack of clock notches In FIG. 5C, (31) depicts a typical protocol flow used in such cases. The communication starts with a period of clock modulated continuous wave propagation (32) to power up the transponders that are passive. This is the default behavior of the interrogator during the communication. Next, a preamble (33) prepares all transponders for incoming command (34). The command could be followed by a data segment (35), depending on the command. As means of verifying data integrity, a Cyclic Redundancy Check (CRC) number (36) is finally sent at the end of the data segment. Immediately afterwards or after a certain period of time, if any, synchronization delay (37) is needed, a synchronization sequence (38) is transmitted whose value and its electrical wave determines a synchronization event that marks the start of the first epoch of the first session of a round. In simpler transponders, the modulation of choice for data modulation on the continuous wave is Amplitude Modulation (AM) because the transponder receiver can be extremely simple and low power. However, in principle, any modulation can be applied to this embodiment. With other approaches, e.g. Frequency Modulation (FM) the signal envelope is not distorted and a better power efficiency is achieved. However, this increase in efficiency does not currently fully compensate for the differences in design simplicity of AM demodulation and higher power dissipation of FM demodulation. Once the start of the session is announced, the continuous wave with modulated system clock (39) continues its broadcast with full strength. In this case, because all the members of the network share the same clock, the whole network is inherently synchronous. A shared clock arrangement does offer some advantages in terms of link robustness and lowered system complexity, but it is not mandatory in the general case.

Figure 6:
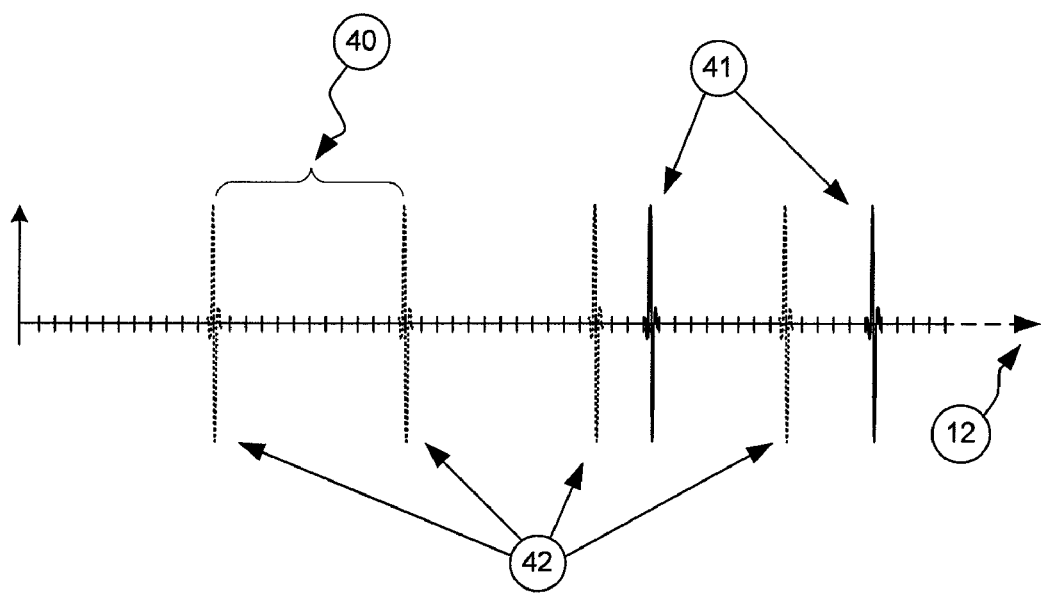
FIG. 6 depicts a UWB-IR downlink. The system clock ticks and epoch boundaries are determined by impulse train (42). Once the epoch and clock are established, additional EPMA impulses (41) which determine commands and data from the interrogator are transmitted inside the epoch boundaries.

FIG. 6 depicts a similar embodiment, where the downlink is also a UWB-IR link. The system clock is in this case delivered to the network, again by the interrogator or the inquirer, in form of a train of regular impulses that is recovered as internal clock sources with proportional frequencies. In FIG. 6, each repetitive impulse defines an epoch boundary delimiter (42) which defines the epoch size (40) of the downlink which is thereby established as a time interval whose size is a function of this system clock. In these epochs, the interrogator can now transmit additional impulses (41). These data impulses can be transmitted in packets as in any conventional UWB approach using the synchronization provided by (40). The data impulses can also be transmitted as depicted in FIG. 6, where impulse positions relative the epoch boundaries determine the data or command values, in full accordance with the EPMA approach used in the uplink. This simple UWB impulse scheme constitutes an extremely simple downlink configuration that, in turn, makes it possible to design an extremely simple UWB-IR receiver on the transponder side. If this signaling scheme is combined with a power delivery approach, such as the one described in FIG. 5, then the transponder power and data paths can be separated completely, as if there is an embedded source of power such as a battery inside the transponder. That is, one or a multitude of continuous wave sources can be used for energizing the transponders and UWB-IR can be deployed as the carrier for the information in both uplink and downlink directions. In FIGS. 5A, 5B, 5C and 6 only the downlink part of two embodiments are shown. Each downlink implementation can actually work with a different uplink variation. Two of these uplink variation embodiments are shown in FIGS. 7 and 8.

Figure 7:
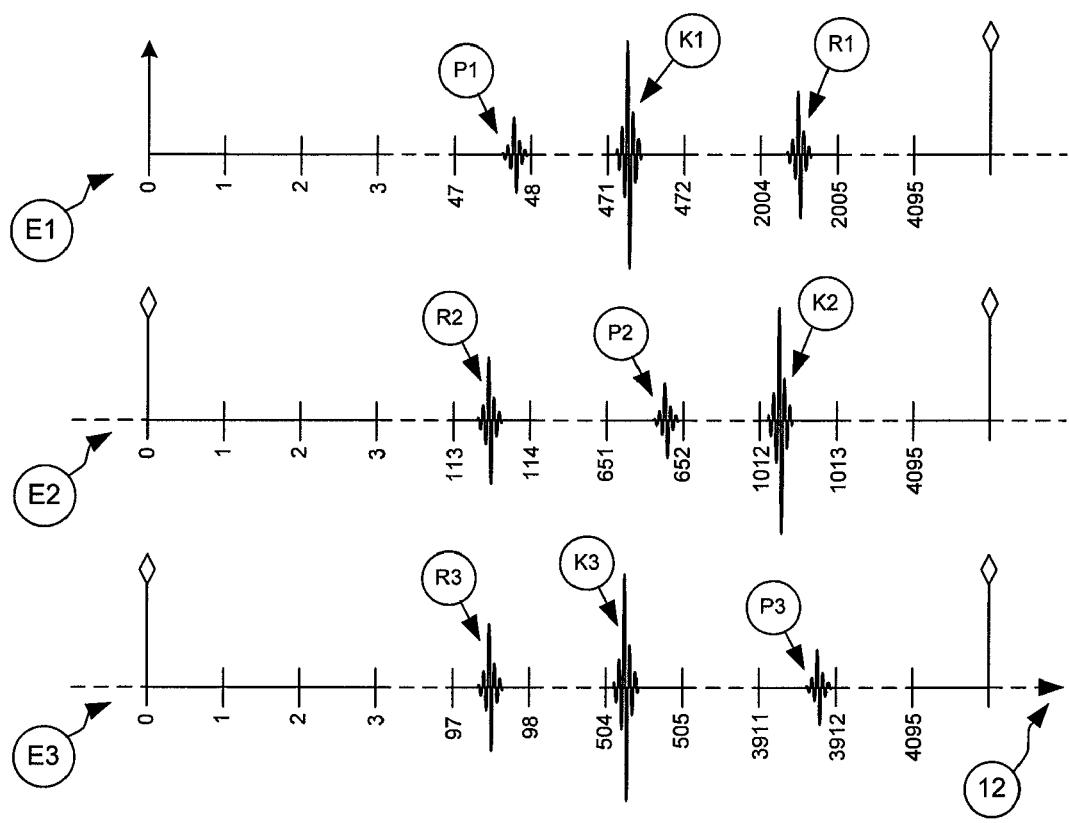
FIG. 7 shows a UWB-IR signaling scheme where the medium resource (12) is time, i.e. the epochs, are time frames whose quanta are timeslots in which impulses are expected to appear. A sequence of epochs (E1), (E2), and (E3) are shown in the FIG. 6. Epoch (E1) contains three impulses (P1), (K1), and (R1). The corresponding impulses in the following epochs are (P2), (Q2), and (R2) in (E2) and (P3), (Q3), and (R3) in (E3). Each epoch is composed of $2^{12}$ or 4096 timeslots. Each impulse can thereby represent a number in the range [0-4095].
Figure 8:
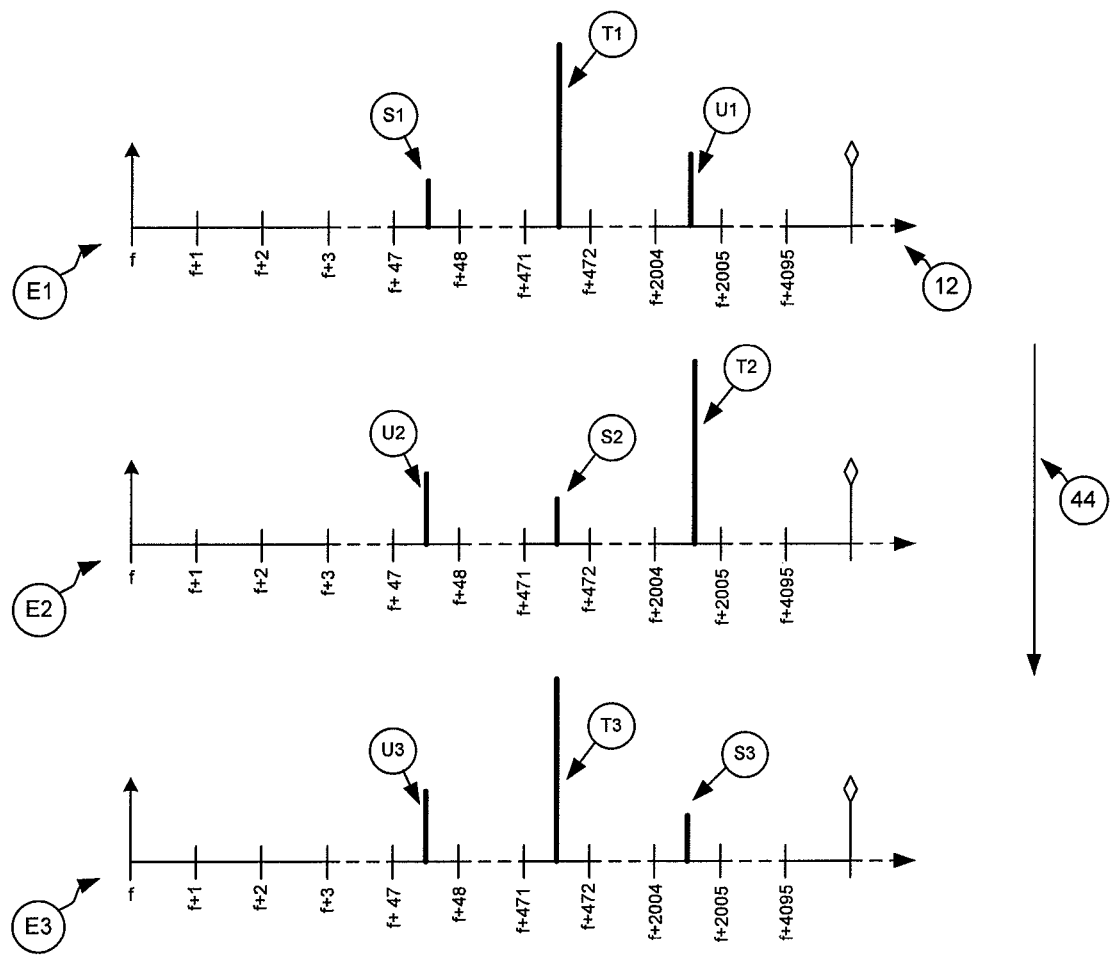
FIG. 8 illustrates the same setup as FIG. 7, but here (12) represents the frequency space and the slots are frequency slots. That is, the epoch (E1) in FIG. 8 is a set of frequency slots or channels that each represent a numeric value with respect to the reference value which is f. Frequency peaks (S1), (T1), and (U1).

In FIG. 7, a pure UWB-IR signaling scheme is implemented. In this fundamental embodiment of the uplink, the only medium resource used (12) is time, i.e. the epochs are time frames whose quanta are timeslots in which impulses are positioned. A sequence of epochs, (E1), (E2), and (E3) are shown in FIG. 7. These epochs create a session in which all the transmitted impulses are collected once. A sequence of sessions forms a round in which all ambiguities raised in individual sessions are resolved.

In the first epoch (E1) in FIG. 7, there are three impulses (P1), (K1), and (R1). The corresponding impulses in the following epochs are (P2), (Q2), and (R2) in (E2) and (P3), (Q3), and (R3) in (E3). Each epoch is composed of $2^{12}$ or 4096 timeslots. Each impulse can thereby represent a number in the range [0-4095].

The size of the timeslot $T_s$ in this embodiment is chosen so that:

$$T_s = 2 \cdot T_p + T_d \qquad (1)$$

where $T_p$ is the signal propagation time between the interrogator to the transponder, multiplied by two because the time reference travels forth and the impulse travels back, and $T_d$ is a time buffer added to the timeslot as a padding for different propagation and circuit effects such as non-line-of-sight paths taken by signals, Doppler effect, clock jitters, and all other inaccuracies and overheads in the system. In one embodiment variation that is discussed later in this section, we show how to compensate for the bulk of these propagation delays by initial calibration of the network configuration.

For an interrogator whose target transponders are expected to be situated in a radius of ten meters around it, $T_p$ is around 30 ns and with a $T_d$ of around 40 ns, a practical size for $T_s$ is 100 ns.

An epoch size is:

$$T_e = 2^n \cdot T_s \qquad (2)$$

where n is the size indicator for the epoch; a 12-bit epoch, e.g. the example in FIG. 7 with n=12, is 4096 timeslots long in units of $T_s$.

In FIG. 7, (P1) represents the value 47 and corresponds to (P2) and (P3) representing values 651 and 3911. The position of P, R, and K impulses inside their timeslots and the strength of their signals is consistent because they are propagated by the same source from a relatively steady distance during the time.

In FIGS. 6 and 7, the axis (12) represents time and impulses are generated inside timeslots. In FIG. 8, a different embodiment is illustrated where (12) represents the frequency space and the slots are frequency slots. That is, the epoch (E1) in FIG. 8 is a set of frequency slots or channels that each represent a numeric value with respect to the reference value which is f. Frequency peaks (S1), (T1), and (U1) in FIG. 8, are functionally identical to (P1), (K1), and (R1) in FIG. 7. Here the relationship between the frequency slot representing the value and the epoch size is:

$$F_e = 2^n \cdot F_s \qquad (3)$$

where n is the size indicator for the epoch; the epoch width $F_e$ for (E1-3) in FIG. 8 with n=12, is 4096 frequency slots $F_s$ wide. The transponder P in FIG. 7 waited 47 $T_s$, e.g. 47×100 ns, before transmitting its (P1) impulse, and the transponder S in FIG. 8 chooses frequency slot 47 $F_s$, e.g. for $F_s$=1 kHz. It transmits a 47×1 kHz tone for a period of time that depends on the receiver's ability to scan all frequency slots, and thereby conveys the number 47. For the EPMA receiver, presence or lack of presence of the tone at frequency slot 47 is enough to infer whether the value is transmitted or not. However, this pure tone can be used as any traditional RF carrier, and carry data modulated in the traditional manner as well, which creates a hybrid of traditional modulations and EPMA. The magnitude of each entry in FIG. 8 represents the signal strength that, among others, is a function of the distance, but most importantly a relatively stable characteristic of a particular transmitter's signals. This characteristic can help match corresponding signals as well.

The resource axis (12) in FIGS. 7 and 8 represents time and frequency, respectively. However, this distinction may be limited to the level of epochs. It is more practical for sessions to occur in time rather than in the frequency space. Even epochs must have a time dimension during which the tones endure. In other words, the transponders can simultaneously use frequency slots 0 to 4095 relative to a base frequency, put out their tones in those slots for a certain period in time, and this constitutes the epoch. The sessions can then be formed by a repetition of the same epoch configuration along the time axis, or another set of frequencies or any other communication resource. The time direction arrow (44) in FIG. 8 indicates that sessions occur along the time axis.

Inter-Epoch Synthesis of the Symbols

In the embodiments discussed below, it is assumed that each transponder occupies one slot per epoch. There are no reasons for a transponder to use multiple slots in an epoch because using m slots in one epoch is principally, although not practically, similar to using one slot in m epochs that are m times smaller. With this assumption in mind, we can analyze the several synthesizing or linking embodiments discussed here. Synthesis or linking in this document means finding the corresponding symbols in each epoch and linking them to one another. Although linking has a connotation of being sequential, the symbols do not necessarily need to come in sequences, but rather in an order that is known to the receiver. From this point of view, the word synthesis serves the general case better. The synthesis procedure is needed for reconstruction of EPMA symbols in a multiple epoch implementation. In a single epoch communication setup, i.e. a configuration where the number of slots in the epoch is more than or equal to the maximum communicated value, there is no need for linking values. A single epoch can comprise all the values that are meant to be conveyed.

Figure 9:
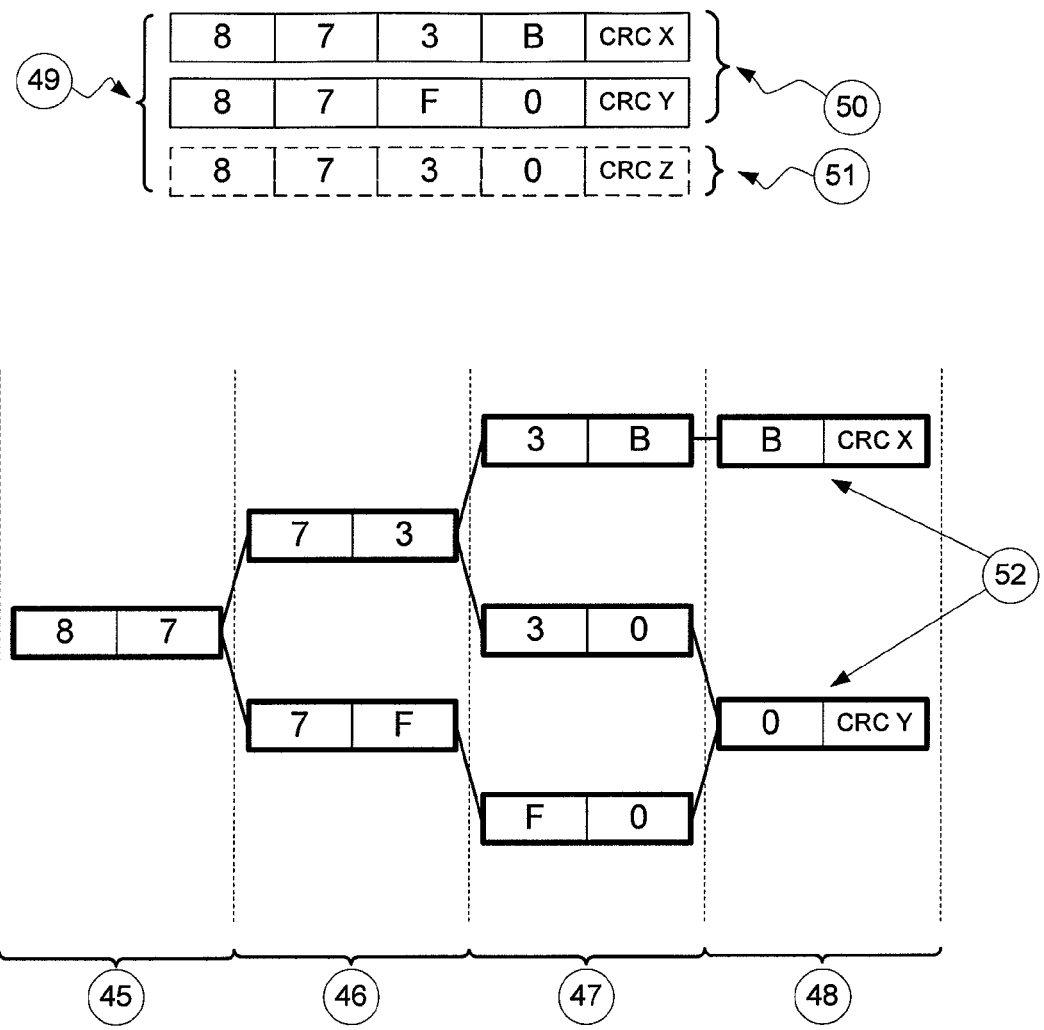
FIG. 9 shows four consecutive epochs (45) to (48). Epoch (45) contains only one EPMA value, the hexadecimal h87, epoch (46) contains two values, h73 and h7F, epoch (47) contains three values, h3B, h30 and hF0, and finally epoch (48) contains two values hB and h0, each followed by two CRC values X and Y, respectively, which are CRC values for the whole chain to which they belong.

The fundamental problem of linking symbols from epochs is that if, for example, there are n symbols in epoch i and m symbols in epoch i+1, then there are have n×m possible matches between the two epochs. In the worst case n and m are equal to the maximum number of slots q, which means for p epochs there are $q^p$ possible matches, which is a prohibitively large ambiguity. One fundamental premise of the invention is that the entropy needed for a selected population is less than the total entropy of the system. In other words, if many bits are needed to address all the items that are globally available, then for addressing a subset of those items present in the network, fewer bits can suffice. For example, in an RFID system that allows for a 128-bit address space, there is numbering capacity to uniquely address $2^{128}$ tags in the world, which is an astronomical number. However, the probability of having more than 1000 tags in the inventory surroundings of an interrogator is very low because of physical constraints. EPMA uses two important properties of such systems to offer an efficient approach to both data modulation and multiple access:

1. Each address is unique
2. With high probability, full entropy is not needed for the subset of the population that is present Linking by Overlapping FIG. 9 shows four consecutive epochs (45) to (48). Epoch (45) contains only one EPMA value, the hexadecimal h87, epoch (46) contains two values, h73 and h7F, epoch (47) contains three values, h3B, h30, and hF0, and finally epoch (48) contains two values hB and h0, each followed by two CRC values X and Y, respectively, which are CRC values for the whole chain to which they belong.

By overlapping segments of consecutive EPMA values, here the rightmost hexadecimal nibble of previous value with the leftmost hexadecimal nibble of the current value, the receiver can infer what values can be linked to others. In this case, h87 in epoch (45) can link to h73 and h7F in epoch (46).

In the next epoch (47), values h3B and h30 link to h73, while hF0 links to h7F. Finally in epoch (48), hB links to h3B and h0 links to h30 and hF0 from epoch (47). This linking procedure creates the graph shown in FIG. 9. According to this graph, the set of chain of numbers listed in (49) constitute the possible formations. However, the formation (51) is a shadow value because, for it to be a real value, the chain should have generated a CRC equal to Z, which is not among the CRC values received in (52). Furthermore, chains in (50) confirm the available CRC values X and Y, which again reaffirms their legitimacy.

Linking by overlapping is a simple approach and lays modest demands on the receiver's complexity under modest density. Besides, the overlapped data itself is a portion of the data loads. Hence it gains a slight performance edge on lower load overhead. However, overlapping in the described manner is a local matching procedure which means, once ambiguities are created, they survive to the end of the chain. In other words, when the overlaps are smaller and the chains are longer, the number of ambiguities and shadow values increase. In such cases, a small CRC number at the end of the chain cannot always resolve the matching ambiguities, and the matching graph may in some cases grow prohibitively large.

To remove remaining ambiguities and survived shadow values in the end of the first session, one could apply a new overlap formula or reshuffle the data to avoid the same set of false matches in the next session and continue this procedure to achieve the required certainty. FIG. 10 shows a chain of numbers forming the unique data (54) to be transmitted in the first session (61) and its modification (55) in the following session (62). Each epoch value is a block of three hexadecimal numbers, e.g. (57), two of which are overlapped by the following epoch value (58). The final CRC number is not shown FIG. 10 as a part of the chains and is assumed to come as a stand-alone final epoch value. Once the chain of epoch values from (57) to (59) are transmitted, a new session begins, this time the content of each epoch value rotated one position, as in (56) and the new epoch value (60) created. The new chain (55) generates a new set of ambiguities that probably do not occur at the same places as before and I thereby alleviates the total amount of ambiguities. The procedure can continue until CRC values yield unique matches. Because the reshuffling is occurring inside epoch values, the rotations very soon repeat themselves, indicating that this approach is not applicable to dense situations and small overlaps. A host of different reshuffling approaches can be used with various performance results. FIG. 11 is an example where the same chain (63) goes through a local rotation of data (66) whose overflow (67) is fed back to the end of the chain, and thereby alters the whole chain and creates new chains (64), (65), etc. for following sessions. This way the chain takes much longer to repeat itself. The overlapping procedure in these chains are shown in (69), (70), and (71), where it is shown how an overlapped segment changes its content in the third session and thereby decreases ambiguity.

The rotation mechanism in this approach can be changed to a Linear Feedback Shift Register (LFSR) that creates a random with a repetition cycle that can be made very long. However, once the system complexity increases beyond a simple shifter, a static random identifier, such as a Session Identifier (SID) usually works better than a dynamic identifier, such as like an overlap segment.

Linking by Code

The transmitted unique data can be coded to be recognized by the receiver as the holder of the decoding key. This is, in principle, what happens in a CDMA system, where data is spread by a code that is pseudo-random and reproducible by the transmitter, as well as the receiver, e.g. by a LFSR. However, in a system of massive interrogation, information about individual members is the immediately sought and normally most important information and cannot be assumed to be apriori knowledge. A more applicable approach is for each transmitter to tag its unique data load with a code. This code can be a pseudo random code that does not require apriori information by the interrogator. If the pseudo random code generation scheme and parameters are known to both transmitters and receivers, then the receiver can regenerate the code on that basis as well. An example of such code is a Cyclic Redundancy Check (CRC) which is applied to all the data transmitted to date. CRC and LFSR are very similar in nature, in that a carefully chosen seed or polynomial for both of them can maximize their randomness.

In FIG. 12, three chains of unique numbers (74) are transmitted by three transmitters. Each transmitter sends an 8-bit number composed of two hexadecimal numbers. In the first epoch, two nibbles of the UID are sent and, in the following epochs, one nibble of the UID and the 4-bit CRC of the chain up to and including that epoch is sent. The seed for the CRC in each session is common, apriori known to all members of the network, and can be pre-programmed auto-generated or provided by the interrogator. In this case, the first epoch (45) contains only the value h87 because it is the first two nibbles of all the chains in (74). The second epoch (46) contains two values, epoch (78) contains a data load h3 and a CRC value of h5, while epoch (77) contains hF and h3, respectively. Here, because CRC for the chains h873 and h87F are different, i.e. h5 and h3, then two branches are created in the graph. The graph continues to branch out at epoch (47), where the CRC values make it possible to have all the chains in (73). The last epoch contains 8-bit CRCs (79), (80), and (81) that result in rejection of the shadow value (75). In this embodiment, the way the CRCs are applied or the nature of the CRC itself as a code could be varied in a multitude of ways. However, one point of this embodiment is to show how a global approach, such as, like the CRC for the whole chain, can work when compared to a local approach such as overlapping. In this approach, if the CRC value h0 in (78) did not match both (76) and (77), then the chain h8730 would have been removed already at that point. However, in a local overlapping this mid-way removal cannot occur. Conversely, two chains of numbers can share the same CRC, as in (78), and a simple local overlap test could resolve their ambiguity before using a computationally heavier approach such as a CRC calculation at each step.

A good compromise can be a combination of CRC and overlaps. One approach is computationally heavy but is a global check that can resolve ambiguities early on. The other approach is a simple local check that can expand and needs a means of reining in its expansion. Linking values by using local overlap checks in one step and applying CRCs in the next step limits the build-up of shadow chains and reduces the number of CRC checks.

Linking by Identifier

In the previous discussion, the CRC value of the chain was embedded up to that epoch in the EPMA value. If the CRC for each chain is calculated for the whole chain, instead of for the value up to that point, then the CRC calculation is required once per session and, hence, reduced to a Session Identifier (SID) i.e. a handle or a short address that could be used for tagging different epoch values during a session. In other words, any pseudo random number with enough randomness among all the transmitters would work. Compared to the previous approach, if SIDs for two or more unique IDs turn identical in the beginning, then those chains remain ambiguous to the end of the session. There are at least three major benefits to this approach:
1. The SID is calculated once. Because this identifier only needs to be pseudo-random, a LFSR can be used instead of CRC.
2. Each transmitter's SID can be used as a short identifier for it in the network during the session or until the SID is renewed.
3. Both receiver and transmitter complexity is reduced dramatically if all ambiguities are discarded. Recovering those units' unique numbers is sought in the following sessions, where new SIDs are used. The probability of collision between the same two units in two consecutive sessions is dramatically lower. This lower complexity may also require more sessions to resolve all identities.

If the identifier is an 8-bit random number, the probability of collision between the same two units is 1/256. The probability for the same units to collide again in the next session with new random identifiers is 1/65,536, for the third session 1/16,777,216 and for the nth session is $1/2^n$. That is the probability of collision between the same two values decreases dramatically over sessions, which combined with the two aforementioned benefits, makes the following embodiment very attractive.

In FIG. 13, a Linear Feedback Shift Register (LFSR) (84) is used to generate a pseudo-random number (PN) based on a seed number (85) provided by internal and/or external sources (88). Such a source can be the interrogator or internally embedded or generated data or a combination of both. The LFSR seed is provided by the content of a register containing the Unique ID, (83) and/or externally provided values that for example an interrogator suggests for resolving a particular conflict. The uniqueness of the UID causes the LFSR to output a PN number that is random for different transponders. A UID is unique, but it is typically a large number and its uniqueness does not mean that it cannot contain long sequences of repetitive or unchanged bit patterns. In fact, if similar transponders numbered sequentially in production are interrogated, the probability of them having very similar UIDs is very high. For example, three transponders with sequential UIDs of 0100 . . . 001, 0100 . . . 010, and 0100 . . . 011 can be subject of interrogation. Such repetitive patterns may impact the randomness of the SID generated by different transmitters. To remedy this problem, the UID can be arranged in a stack of UID segments (86) that undergo a carry-free summation operation output of which is Exclusive-Ored with the output of the LFSR. In the example in FIG. 13, the UID (83) is 128 bits long, and the stack (86) is 8 bits wide and 16 bits high. The LFSR seed (85) is 8 bits wide, the LFSR produces an 8-bit PN and the SID (87) is 8 bits long.

The divisions in sizes of (84), (85), (86) and subsequently (87) should be flexible in an EPMA solution because, for optimal operation, the size of the SID should adapt to the number of the transponders in the network. The clock steps of (83) can also change, as long as the pattern of change is known to the network. The seed (85) is optimized for the operation of LFSR, but if the interrogator wishes to change the seed, the transponder complies. At least two specific cases where the latter is applicable are:
1. The interrogator wants to resolve a specific ambiguity.
2. The interrogator wants to enforce the generation of a set of SIDs that it deems favorable for the network operation.

The SID generated by each transponder is used to tag the data load that is to be transmitted. That is an EPMA value is composed of two segments, one of which is the SID and the other of which is the load. If the SID constitutes the Most Significant Bits (MSB) of the EPMA value, then the SIDs divides the epoch in segments in which the load is uniquely positioned. This situation is illustrated in FIG. 14, where the EPMA value (25), i.e. the slot in which the impulse (24) is located, is a value composed of the SID (26) and the load (27). The position determined by the SID is indicated by (28). From this position to the next increment of SID, the field is dedicated to the position of any load corresponding to that SID. The size of this data load field is:

$$T_{df} = 2^w \cdot T_s \qquad (4)$$

where w is the number of bits dedicated to the data load.

If two or more transponders generate similar random SIDs, their data loads fall into the same SID field and cause ambiguity. In the following sessions, their SIDs are most probably different and thereby the matter is resolved.

Two important features of this approach are:
1. The SID can be used to calibrate and compensate for signal propagation time.
2. A successful SID can be used for general purpose, i.e. non-unique data communication.

An embodiment of the first is shown in FIG. 15, and two embodiments of the second are illustrated in FIG. 14—it works exactly as with SID synthesis—and FIG. 16.

The embodiment of the calibration procedure for propagation delay in FIG. 15 is based on the fact that if all transponders transmit empty data loads (27) in the initial epoch (E0), then because their data load is zero, the position of their transmitted symbol (24) only shows the bias caused by channel delay. FIG. 15, the EPMA value represented by position (25) contains a SID (26) that causes the signal to fall into the field that belongs to that SID. The field is $T_{df}$ large and the zero-data signal falls at the beginning of the field if there are no delays in the communication channel. By observing where in the field the signal actually occurs, the total channel delay (90) is captured. Given that this delay is mainly caused by propagation delay, the distance to the transponder can be directly inferred from it as were. $T_{df}$ can dictate the range in which signals can be captured, if the signal strength can manage to reach the detection level.

Another practical consequence of this calibration procedure is that the signal strengths that should be noticed by the interrogator can be estimated. For example, if for any reason a transponder's signal strength is attenuated but its position is not affected correspondingly, the receiver can adjust the threshold for expected signal level by taking that attenuation into account.

Putting the SID in the Least Significant Bits of the EPMA value can be made to behave similarly by some alterations and slight modifications. When dealing with SIDs, regardless of the epoch size, the probability of ambiguity is $1/2^m$, where m is the number of SID bits. That is, for a n-bit epoch value in which the 8 bits are dedicated to the SID and the remaining n−8 bits are dedicated to the data load, regardless of n, the probability of ambiguity in each address is $1/2^8$. This is because all transponders with the same SID put their numbers in that field and consequently make matching for all signals with that address ambiguous.

An Asynchronous Embodiment

The embodiments described so far have all been synchronous in that the transmitters and receivers shared the same system clock. However, EPMA can be easily applied to an asynchronous network as well. In this case, transmitters as well as receivers use their own local clocks whose frequency and phase are nominally the same but differ considerably in practice.

FIG. 17 shows an asynchronous embodiment that is similar to the embodiment in FIG. 15. In FIG. 17, the communication link, as seen by the interrogator, is depicted in three epochs. (E1), (E2) and (Ei) are the first, the second, and an arbitrary epoch occurring after (E1) and (E2), respectively. The transponder epoch values are, as the case was in FIG. 15, composed of a SID and a data load embodied in each impulse. During (E1), each transponder transmits its SID and a data load equal to zero. The transponders repeat the same in (E2), but this time the data value is equal to a fixed a-priori known value (Q). The fixed value could be any number in the set of possible data load values. The idea here is to use (Q) to determine the quantum with which each transmitter calculates its epoch positions. The local oscillators in different transmitters run at slightly different frequencies, and (Q) as a function of the local oscillator frequency can be used by the receiver to determine this difference compared to the receiver's reference oscillator. Note however that in this case, the epoch start references are still shared by members of the network. In FIG. 17, (Q) in (E2) is positioned to symbolize the data load 1 and (TT) is marking the span of the data load. An account of the impact of the size of (Q) is given below, but in the following, to simplify the calculations, we assume that (Q) is a dislocation corresponding to value 1.

During (E1), the reader keeps track of the time for each received impulse. This time stamp indicates the reader perception of each transmitter's SID. Because the transmitter and the reader have different clocks, the reader's perception of the SID typically deviates from that of the transmitters. For example, a transmitter that aims at delivering value $V_t$ would send an impulse at time T such that:

$$T = V_t \cdot Q_t \quad (5)$$

where $Q_t$ corresponds to (Q) in FIG. 17 with value 1 and is the duration of the time slot, a time quantum that is a function of the free-running local oscillator of the transmitter. In the same way, the reader interprets the value $V_r$ by using its own time quantum $Q_r$ as follows:

$$T = V_r \cdot Q_r \quad (6)$$

that is, because the reader knows its own values $V_r$ and $Q_r$, then if $Q_t$ is known, the reader can figure out the real value that the tag meant to convey:

$$V_t \cdot Q_t = V_r \cdot Q_r \rightarrow V_t = V_r \cdot Q_r / Q_t \quad (7)$$

By deploying the following scheme, the receiver can figure out the tag concept of its time slot $Q_t$. In the first epoch, the SID is the only value that is delivered, i.e. data load is zero. In the second epoch the data load is changed to value one. That is, for each SID, the symbol position in the second epoch is dislocated by $Q_t$. This way, the reader can completely calibrate each SID during the two first epochs. By understanding the deviation of each tag's $Q_t$ from that of the receiver, $Q_r$, the reader can calculate the real value of the SID and the data load of the transmitter associated to that SID.

In any other arbitrary epoch such as (Ei), the position of an impulse (24C) relative (24) in (E1) determines the value (P) that, together with the correction attained from the calibrations derived through (E1) and (E2), determines the value of the data load If (Q) is chosen to be small, e.g. 1, the small dislocation representing the value 1 relative to the reference impulse (24) in (E1) increases the probability of finding unambiguous correspondence between (24B) and (24), but dividing (TB) or (TQ) with such a small (Q) may result in a larger error, because any error in reading (24B) is multiplied by the value conveyed by (24). Conversely, a large (Q), e.g. 15 in the case of a 4-bit load, results in better precision, but may increase the probability of ambiguity in correspondence. With any (Q) different from 1, the calculations above must be reformulated accordingly.

The asynchronous nature of this embodiment may cause different transmitters to transmit their signals in positions that nominally and, from the receiver's point of view, belong to other sources. Therefore, the receiver must rely on matching of the signals to link symbols that belong to the same source.

Two fundamental tests can filter out most mismatches. For each symbol in (E2), there exists a space to which all possible matches are confined. This space is determined by how much error can be accumulated during (Q). For example, if the nominal value for (Q) in FIG. 17 is Q, equal to 1 and the maximum variation of Q is Δ, a calibration symbol such as (24B) in (E2) should fall within the nominal Q_±Δ. If Δ is % 50 of the nominal Q, then the possible signals in (E1) that could be a match for our calibration symbol (24B) in (E2) lies in the region limited by %50 to %150 of Q before it. These limits are marked in FIG. 18 with labels (L50) and (L150), respectively. In FIG. 18, (W1-4) indicate positions for symbols in (E1) that occur prior to (24B) in (E2). As seen in FIG. 18 however, only (W2) and (W3) are located inside (L150-50) limits of error for the signal that can correspond to (24B), and thereby only those two signals are considered for the next stage of filtering.

The first stage of filtering left two quantum candidates: (Q1) and (Q2). For these two to be viable candidates, they must be nearly whole number divisors of (TW2) and (TW3), respectively. This whole number criterion filters out the wrong candidates efficiently. If there still remain any ambiguities, the easiest approach is to reject those SIDs for this session and try to recover those transmitter identities in a following session where a new set of SIDs are generated With the information in (E2), SIDs for all transmitters are recovered and the positioning quanta for different transmitters are registered by the receiver and all ambiguities are resolved or rejected. From this point on, any symbol that appears in the data load span of any set of SIDs should qualify to be a multiple of one of the SIDs' quanta.

Data Communication

Once all of the UIDs are collected in a network, an interrogator can use this information to access individual members uniquely. Using a large address base is not practical and is unnecessary, so it is customary to use a shorter unique handle to each member. The SID introduced here is similar to a handle. Each transmitter can generate a SID internally by itself or based on a seed number provided by the receiver. Because the receiver already knows about all transmitter UIDs, principally, it is capable of producing a seed that could result in a unique SID for each member given that the network density is smaller, preferably much smaller, than the largest number the seed may generate. Transmit-only units, unaware of all other transmitters in the network, cannot guarantee a unique SID. Subsequently, their locally randomly generated SID may turn out to be similar to another transmitter's SID. Any conflicts of this kind can be resolved by negotiations between transmitters and receivers, but any such negotiation attempts add an additional communication overhead.

As shown in FIG. 14, each transponder in the network uses its long globally unique UID to generate a short, locally unique SID (26) and, in turn, uses this shorter address to position its impulse (24) in a slot number (25) inside an epoch (E), representing a total EPMA value of (25) relative the epoch marker (1). The slot number (25) is composed of the position (28) determined by the SID (26) and the EPMA value of the data load (27) relative (28). In the same manner, the data loads of the UIDs are conveyed here. Because the UIDs are already collected and the SIDs are unique for all members of the network, any kind of data can now be delivered by the SID-tagged EPMA values.

In the above, it is assumed that the interrogator suggests a seed that causes each transponder to generate a unique SID. The interrogator may however, choose another approach to address the need for unique SIDs. During the process of collecting UIDs, when the transponders randomly generated their SIDs, the assumption is that the SIDs collide in some instances, but the probability of collisions decreases drastically in following sessions. Instead of trying to compute a seed that results in orthogonal, i.e. unique SIDs, in a single session it may pick the seeds resulting in orthogonal SIDs in fewest number of sessions. This approach results in a lower total throughput, but lower complexity.

FIG. 16 shows a different case where the SID is used to determine a slot position (26) in two consecutive epochs (Ei) and (Ej). Each transmitter positions its impulse in its dedicated slot (26) inside each epoch during the whole session. The data is conveyed by traditional modulation inside the slot. Impulses (29) and (30), for example, belong to the same transmitter but are phased shifted by 180 degrees which implies two different binary states for the signal, i.e. 1 and 0. As with the previous example, it is not mandatory to use a single symbol in the slot and a sequence of symbols could be transmitted in a single slot. However, for longer bursts, this approach is suboptimal in terms of sudden power dissipation and current drain. Part of the objective of the invention is to increase the room between symbol transmissions to avoid a sudden current drain caused by a rapid consecutive burst of impulses. Hence, it is more in line with EPMA to decrease the size of the epochs and fire a single or very few impulses in each epoch.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
transforming a digital word into linked words according to a linking algorithm, wherein each linked word represents a corresponding portion of the digital word, and wherein the linked words are M-bit words, M being an integer; and
from a transmitter, successively transmitting each of the linked words as a symbol in a time slot selected from a plurality of at least $2^M$ time slots according to a binary value of the successively transmitted linked word wherein a receiver is enabled to recover the digital word from the transmitted linked words according to the linking algorithm.

2. The method of claim 1, wherein said linking algorithm comprises an overlapping algorithm in which the linked words comprise overlapping portions of the digital word.

3. The method of claim 1, wherein the linking algorithm comprises a coding algorithm in which the digital word is segmented into portions corresponding to the linked words such that a first one of the linked words comprises a first one of the portions of the digital word and succeeding ones of the linked words each comprises its corresponding portion of the digital word and a code that is a function of the corresponding portion and all preceding portions.

4. The method of claim 1, wherein the linking algorithm comprises a linking-by-identifier algorithm in which the digital word is segmented into portions corresponding to the linked words such that each of the linked words equals its corresponding portion of the digital word and a session identifier (SID) that is a function of the digital word.

5. The method of claim 1, said method comprising an efficient medium access method for ultrawide band (UWB) communication, radio communication, Radio Frequency Identification (RFID) devices, or UWB-based RFID devices.

6. The method of claim 1, wherein said digital word comprises
a unique identifier.

7. The method for claim 3, wherein the code is a cyclic redundancy check (CRC) code.

8. The method of claim 1, wherein for each selected time slot, the transmitted symbol is an ultra wideband pulse.

9. An RFID ultra wideband (UWB) tag configured to transmit linked words according to the method of claim 8.

* * * * *